US005827606A

United States Patent [19]

Marumoto et al.

[11] Patent Number: 5,827,606

[45] Date of Patent: Oct. 27, 1998

[54] LOW ELECTRIC NOISE ELECTRODE SYSTEM

[75] Inventors: Ikuo Marumoto, Anjyo; Taisuke Miyamoto, Okazaki; Satoru Tojo; Toshio Asahi, both of Toyota; Hiroshi Morita, Toyota; Iwao Hibino, Toyota; Kimitoshi Murata, Toyota; Nobuyuki Ishihara, Toyota, all of Japan

[73] Assignee: Toyota Jidosha Kabushiki Kaisha, Toyota, Japan

[21] Appl. No.: 610,975

[22] Filed: Mar. 1, 1996

Related U.S. Application Data

[63] Continuation of Ser. No. 278,970, Jul. 22, 1994, abandoned.

[30] Foreign Application Priority Data

| | | | |
|---|---|---|---|
| Jul. 22, 1993 | [JP] | Japan | 5-202662 |
| Nov. 19, 1993 | [JP] | Japan | 5-290835 |
| Mar. 1, 1994 | [JP] | Japan | 6-031262 |
| Jul. 5, 1994 | [JP] | Japan | 6-153857 |

[51] Int. Cl.[6] .............................. B32B 3/00; B32B 9/00

[52] U.S. Cl. .............................. 428/209; 428/210; 428/688; 428/701; 428/702; 428/901

[58] Field of Search .............................. 428/209, 901, 428/210, 688, 701, 702

[56] References Cited

U.S. PATENT DOCUMENTS

| | | | |
|---|---|---|---|
| 3,992,230 | 11/1976 | Komiyama et al. . | |
| 4,091,245 | 5/1978 | Komiyama et al. . | |
| 4,217,470 | 8/1980 | Kirner . | |
| 4,419,547 | 12/1983 | Imai et al. . | |
| 5,102,720 | 4/1992 | Raj | 428/209 |

FOREIGN PATENT DOCUMENTS

| | | |
|---|---|---|
| 27 58 502 | 11/1978 | Germany . |
| 40 15 487 | 11/1990 | Germany . |
| 42 23 684 | 1/1993 | Germany . |
| 54-38446 | 3/1979 | Japan . |
| 54-50735 | 4/1979 | Japan . |
| 58-23278 | 2/1983 | Japan . |
| 59-23074 | 2/1984 | Japan . |
| 61-53461 | 3/1986 | Japan . |
| 1-22472 | 4/1989 | Japan . |

*Primary Examiner*—Patrick Ryan
*Assistant Examiner*—Cathy F. Lam
*Attorney, Agent, or Firm*—Oblon, Spivak, McClelland, Maier & Neustadt, P.C.

[57] ABSTRACT

In the electrode for preventing noise electric wave according to the present invention in which the resistivity of the second layer is larger than that of the first layer, it is possible to prevent the generation of noise electric wave. In the electrode for preventing noise electric wave according to the present invention in which the layer for preventing noise electric wave has the porosity of not more than 20%, it is possible to prevent the radio noise. In the electrode for preventing noise electric wave according to the present invention in which the high-fusing conductive material layer exists between the substrate and the resisting material layer, it is possible to prevent the formation of the concave portion.

20 Claims, 22 Drawing Sheets

PNL OPERATING TIME: 320μs

PNL OPERATING TIME: 60μs

28··· COVERING PORTION

ELECTRIC CURRENT PROFILE MODEL AT THE TIME OF FIRST DISCHARGE

INDUCTION DISCHARGE PROFILE AT THE TIME OF FIRST DISCHARGE

LOW ELECTRIC NOISE ELECTRODE SYSTEM

This application is a Continuation of application Ser. No. 08/278,970, filed on Jul. 22, 1994, now abandoned.

BACKGROUND OF THE INVENTION

1. Field of the Invention

This invention relates to an electrode for preventing noise electric wave and a method thereof which prevents the generation of noise electric wave, especially, the generation of noise electric wave for the radio which is loaded on automobiles and the like. The electrode according to the present invention is used as a rotor electrode of distributor of automobiles.

2. Description of the Related Art

In conventional distributor of an internal combustion of automobiles, a rotor electrode rotates to intermittently oppose a side-fixed electrode having a small clearance between them. The rotor electrode and the side-fixed electrode discharge between them so that they feed a number of ignition plugs. However, in this conventional feeding method, noise electric wave (ignition noise) is generated due to spark discharge between the rotor electrode and the side-fixed electrode. Since the noise electric wave has wide and high frequency band, it causes hindrance on radiocommunication such as TV or radio, electronic equipments loaded on automobiles and the like; for example, EFI (electronical controlled fuel injection apparatus), ESC (electronic skid control apparatus), EAT (electronic control automatic transmission).

As shown in FIG. 45, the above spark discharge current comprises capacity discharge current and induction discharge current. The capacity discharge current is high-frequency current which flows for 10 micron seconds from the beginning of discharge at the initial discharge stage due to rapid build-up. The induction discharge current is low-frequency current (about 10 to 100 mA) which continuously flows for 500 to 1500 micron seconds soon after the capacity discharge current flows.

Ignition energy supplied for the ignition plug is proportionated with the product of the induction discharge current and its discharge duration. Concerning the induction discharge current, since the absolute value level of the current value is low, it has little influence on the noise electric wave. Therefore, in order to effectively prevent the noise electric wave without decreasing the ignition energy, it is important that the starting voltage and the capacity discharge current are firmly decreased.

Conventionally, various measures for preventing noise electric wave have been taken. For example, a method for placing the resistor outside or inside of the plug, a method for introducing resistance to a part of high-voltage wiring, a method for establishing a condenser in order to prevent noise. However, in these methods, effects are not sufficient and reliability is deteriorated.

Japanese Patent Registration No. 858984 discloses that high electrical resistance substance is formed on the surface of the discharge electrode in order to prevent the generation of noise electric wave caused by discharge gap. However, in this method, only 5 to 6 dB of noise can be decreased so that required performance cannot be achieved.

Japanese Unexamined Patent Publication No. 50735/1979 discloses the technique in which the discharge electrode which is one element of ignition distributor of internal combustion is performed by surface treatment so that the starting voltage and the capacity discharge current are decreased, thereby preventing noise electric wave. In this technique, mixed powder comprising CuO (cupric oxide) and $Al_2O_3$ (alumina) is thermal sprayed on the surface of the discharge electrode to form the layer for preventing noise electric wave. Thus, the layer for prevention of noise electric wave is formed on the surface of the discharge electrode which is faced to an opposite electrode. In the electrode for preventing noise electric wave, preliminary micro discharge is generated between CuO as oxide resistor and $Al_2O_3$ as oxide dielectric substance, so main discharge voltage generated between CuO and the opposite electrode is reduced, thereby decreasing the capacity discharge current. The effect of the preliminary micro discharge is called as Malter effect, and the method for preventing noise electric wave which makes use of Malter effect is recently noticed.

Japanese Examined Patent Publication No. 22472/1989 discloses one example of the electrode for preventing noise electric wave which makes use of Malter effect. This electrode comprises an electrode substrate and a resistive material layer coated on the surface of the electrode substrate which is faced to the opposite electrode. The resistive material layer is made of semi-conductive alumina-ceramics material. The resistive material layer is formed on the surface of the electrode substrate because titania ($TiO_2$) is added to oxide ceramics mainly comprising alumina ($Al_2O_3$), and reducing treatment is performed in reducing atmosphere. In the electrode for preventing noise electric wave, preliminary micro discharge is generated between titania having semi-conductivity (resistivity) and alumina as dielectric substance, so main discharge voltage generated between the electrode for preventing noise electric wave and the opposite electrode is reduced, thereby decreasing the capacity discharge current.

However, in the method for preventing noise electric wave which makes use of Malter effect, the effect for preventing noise electric wave is not sufficient so that more effect is required. As a result, a bonding wire or a H/T code for prevention of noise electric wave is required. Therefore, there are disadvantages in cost and assembling manhour.

When the conventional electrode for preventing noise electric wave disclosed in Japanese Unexamined Patent Publication No. 50735/1979 is applied for a rotor electrode of distributor, noise is generated in the radio loaded on automobiles. In this case, radio noise is terrible as compared with the case in which the rotor electrode without layer (thermal sprayed layer) for preventing noise electric wave is used.

Since the radio is easily influenced by electric wave and electric noise, the radio loaded on automobiles has PNL (Pulse Noise Limiter) function in order to control noise generation due to ignition noise. The PNL function is the function in which ignition noise in sound signal is absorbed by shutting the gate for a predetermined time (about 20 micron seconds) when the pulse noise above the predetermined level is input through antenna.

There are two kinds of rotor electrodes: one is the rotor electrode in which the layer (thermal sprayed layer) for preventing noise electric wave is formed on the surface of the rotor electrode faced to the opposite electrode by use of the normal thermal spraying method that thermal spraying is performed in the direction perpendicular to the surface, and the other is the rotor electrode without the layer. FIG. 46 shows the difference of electric wave form between them at the time of induction discharge. $Al_2O_3$+60 wt % CuO is used as thermal spraying material.

As shown in FIG. 46, as compared with the rotor electrode without the layer, in the rotor electrode with the layer (thermal sprayed layer) for preventing noise electric wave, induction discharge in which the absolute level of the current value is high can be maintained for a long time. In accordance with this, PNL operating time becomes longer. There are interrelation between the PNL operating time and the level of the radio noise. Therefore, in the electrode with the layer for preventing noise electric wave which is formed by use of the normal thermal spraying method, the radio noise becomes deteriorated.

Inventors have studied the cause of deterioration of the radio noise in the rotor electrode with the layer (thermal sprayed layer) for preventing noise electric wave, and they have found that the porous part in the thermal sprayed layer have bad influence on the radio noise.

When the thermal sprayed layer has the porous part, much amount of micro discharge is generated between thermal spraying materials at the time of discharge, and relatively large induction discharge current continuously flows for a long time. As a result, the pulse noise caused by induction discharge current is input into the radio, and the PNL function repeats ON/OFF action of the gate for a long time. Therefore, the pulse noise input from the antenna of the radio is cut off, but the radio noise due to the repeated ON/OFF action of the gate in PNL circuit is generated. For example, when induction discharge current continuously flows for 1000 micro seconds, the PNL function repeats ON/OFF action of the gate about 50 times to firmly generate the radio noise.

The porous part in the thermal sprayed layer results from the method for thermal spraying. Namely, in the process for thermal spraying on the surface of the rotor electrode faced to the opposite electrode, thermal spraying is performed in the direction perpendicular to the surface. At this time, the thermal spraying materials are adhered to the surface which is perpendicular to the thermal spraying direction, and also to the surface which is horizontal to the thermal spraying direction. Therefore, thick thermal spraying layer is formed on the surface which is perpendicular to the thermal spraying direction, and the porous thermal spraying layer is formed on the surface which is horizontal to the thermal spraying direction.

In the conventional electrode for preventing noise electric wave disclosed in Japanese Examined Patent Publication No. 22472/1989, there are drawbacks in the durability. When the conventional electrode had been used for a long time, electric noise (radiation field intensity) had been increased, and required efficiency level could not be obtained.

In order to study the cause of the above problems, inventors have observed the discharge generating situation. As a result, although the resistive material layer having high electric resistive value has a close distance from the opposite electrode, discharge is not generated at the resistive material layer. Only at the part of the electrode substrate having low electric resistive value which is near the opposite electrode, namely, at the portion of the electrode substrate which is near a boundary portion between the electrode substrate and the resistive material layer, discharge is generated. Inventors have examined the relationship between the discharge generating situation and noise electric generating situation, and they found that the discharge generating situation is closely related to the durability of the electrode for preventing noise electric wave. When discharge is generated at the portion of the electrode substrate which is near the boundary portion between the electrode substrate and the resistive material layer, the electrode substrate is fused by heat at the time of discharge since the electrode substrate comprises metal materials having lower fusing point than that of ceramics. Inventors have found that the temperature at the time of discharge reaches about 1300° to 1500° C. sectionally. As a result, when the electrode had been used for a long time, a concave portion is formed at the portion of the electrode substrate which is near the boundary portion between the electrode substrate and the resistive material layer due to fused loss, and discharge is generated at the bottom of the concave portion. Then, discharge is hard to occur, or micro discharge is frequently occurred and relatively large induction discharge current continuously flows since the discharge passage becomes complicated. Therefore, noise electric is increased.

SUMMARY OF THE INVENTION

In view of the above disadvantages, a first object of the present invention is to further prevent noise electric wave by means of improvement of electrode.

A second object of the present invention is to decrease the radio noise caused by the existence of the porous portion at the layer (thermal sprayed layer) for preventing noise electric wave of the electrode.

A third object of the present invention is to prevent the formation of the concave portion at the portion of the electrode substrate which is near the boundary portion between the electrode substrate and the resistive material layer to effectively prevent the noise electric wave after the electrode had been used for a long time.

The electrode for preventing noise electric wave and for solving the above first object of the present invention comprises a substrate; a first layer comprising metal oxide, and being formed on the surface of the substrate faced to an opposite electrode; and a second layer comprising metal oxide, being formed on the surface of the first layer faced to the opposite electrode, and having larger resistivity than that of the first layer.

The electrode for preventing noise electric wave and for solving the above first object of the present invention comprises a substrate; a first layer comprising oxide resistor, and being formed on the surface of the substrate faced to an opposite electrode; and a second layer comprising oxide resistor, being formed on the surface of the first layer faced to the opposite electrode, and having larger resistivity than that of the first layer.

The electrode for preventing noise electric wave and for solving the above first object of the present invention comprises a substrate; a first layer comprising oxide dielectric substance and oxide resistor, and being formed on the surface of the substrate faced to an opposite electrode; and a second layer comprising oxide dielectric substance, being formed on the surface of the first layer faced to the opposite electrode, and having larger resistivity than that of the first layer.

However, there is the problem on the electrode for preventing noise electric wave. Namely, when the electrode has been used, pin hole is generated on the surface of the electrode, and oxide dielectric substance on the surface of the electrode is omitted. As a result, the effect for preventing noise electric wave cannot be maintained for a long time. Then, inventors have been further studied and completed the electrode which prevents pin hole and can maintain the effect for preventing noise electric wave for a long time.

The completed electrode for preventing noise electric wave and for solving the above first object comprises a substrate; a first layer comprising oxide dielectric substance and oxide resistor, and being formed on the surface of the substrate faced to an opposite electrode; and a second layer comprising oxide dielectric substance and oxide resistor, being formed on the surface of the first layer faced to the opposite electrode, and having larger resistivity than that of the first layer.

In the above electrodes for preventing noise electric wave, the method for forming the first layer and the second layer is not restricted, and various methods for forming the layer can be applied, for example, plasma spraying method, ion plating method, sputtering method and so on. However, when the second layer comprising metal oxide and having larger resistivity than that of the first layer is formed on the surface of the first layer comprising metal oxide, considering the cost, it is preferable that the second layer is formed on the surface of the first layer by performing oxidation treatment on the surface of the first layer.

The method for producing the electrode for preventing noise electric wave comprises a process for forming a first layer which comprises metal oxide on the surface of a substrate faced to an opposite electrode, and a process for forming a second layer which comprises metal oxide and has larger resistivity than that of the first layer on the surface of the first layer faced to the opposite electrode by performing oxidation treatment on the surface of the first layer.

The electrode for preventing noise electric wave and for solving the above first and second objects comprises an electrode substrate; and a layer for preventing noise electric wave comprising thermal sprayed layer, being coated on the surface of the electrode substrate faced to an opposite electrode, and having the porosity of not more than 20%.

Materials of the layer for preventing noise electric wave are not especially restricted, and high electric resistive material or electric insulating material can be used alone or in combinations. Furthermore, semi-conductive material can be used. Concretely, the high electric resistive materials include CuO, $Cr_2O_3$, NiO, ZnO and so on; the electric insulating materials include $Al_2O_3$, $SiO_2$, $ZrO_2$, MgO and so on; the semiconductive materials include FeO, $Fe_2O_3$, $TiO_2$, ferrite and so on. It is preferable that oxides are used as materials of the layer for preventing noise electric wave in order to prevent oxidation deterioration due to discharge in the atmosphere.

The electrode for preventing noise electric wave can be manufactured by the following methods.

The first method for producing the electrode comprises a process for forming a layer for preventing noise electric wave comprising the thermal sprayed layer which is formed on one surface of the electrode substrate, and in which thermal spraying is performed in the direction perpendicular to the surface, and which has the porosity of not more than 20%; and a process for removing the thermal sprayed layer in which thermal spraying is performed on the other surface of the electrode substrate, and which has the porosity of more than 20%.

In the first method for producing the electrode, the means for removing the thermal sprayed layer in which thermal spraying is performed on the other surface of the electrode substrate, and which has the porosity of more than 20% is not especially restricted. For example, a grinding processing by means of grinder can be used.

The second method for producing the electrode comprises a process for laminating a number of electrode substrates; a process for forming the layer for preventing noise electric wave comprising the thermal sprayed layer which is formed on each edge surface of each electrode substrate, and in which thermal spraying is performed in the direction perpendicular to each edge surface, and which has the porosity of not more than 20%; and a process for separating the layer for preventing noise electric wave along a dividing line of each electrode substrate.

The third method for producing the electrode comprises a process for laminating a number of electrode substrates having a spacer therebetween in which edge portion of each spacer is projected from the edge surface of each electrode substrate by the predetermined length; a process for forming the layer for preventing noise electric wave comprising the thermal sprayed layer which is formed on each edge surface of each electrode substrate, and in which thermal spraying is performed in the direction perpendicular to each edge surface in such a manner that the thickness of the thermal sprayed layer is thinner than the above predetermined length, and which has the porosity of not more than 20%; and a process for removing the layer for preventing noise electric wave from each spacer.

The fourth method for producing the electrode comprises a process for laminating a number of electrode substrates; a process for forming the substrate thermal sprayed layer which is formed on each edge surface of each electrode substrate, and in which thermal spraying is performed in the direction perpendicular to each edge surface; a process for separating the substrate thermal sprayed layer along a dividing line of each electrode substrate; a process for re-laminating each electrode substrate coated with the substrate thermal sprayed layer; a process for forming the layer for preventing noise electric wave comprising the thermal sprayed layer which is coated on the substrate thermal sprayed layer formed on each edge surface of each electrode substrate, and in which thermal spraying is performed in the direction perpendicular to each edge surface of re-laminating electrode substrate, and which has the porosity of not more than 20%; and a process for separating the layer for preventing noise electric wave along a dividing line of each electrode substrate.

In the second to fourth methods, it is preferable that the layer for preventing noise electric wave is made a notch by cutter or grinder for cutter to be separated.

The fifth method for producing electrode comprises a process for laminating a number of electrode substrates; a process for forming the layer for preventing noise electric wave comprising the thermal sprayed layer which is formed on each edge surface of each electrode substrate, and in which thermal spraying is performed in the direction perpendicular to each edge surface in such a manner that the electrode substrate is swung in order to repeat relative displacement between the two edge surfaces of two neighboring electrode substrates, and which has the porosity of not more than 20%.

In the second to fifth methods, it is preferable that a number of electrode substrates are laminated in such a manner that each edge surface of each electrode substrate faced to the opposite electrode is exposed on the same surface because it is necessary to form the layer for preventing noise electric wave on the edge surface of the electrode substrate faced to the opposite electrode.

In the second to fifth methods, it is preferable that the electrode substrates having wide area are laminated with each other since the thermal spraying materials are not adhered to the surface of the electrode substrate which is horizontal to the thermal spraying direction. Namely, when the edge surface of the electrode substrates is rectangular form, it is preferable that the electrode substrates are laminated with each other in such a manner that the surface having long edge is overlapped with the other surface having long edge. It is more preferable that the electrode substrate is laminated with each other not only in one direction but also in two crossing directions in order that the thermal spraying materials are not adhered to the surface which is horizontal to the thermal spraying direction.

The sixth method for producing the electrode comprises a process for forming the layer for preventing noise electric wave comprising the thermal sprayed layer which is formed on one surface of long-shaped electrode substrate, and in which thermal spraying is performed in the direction perpendicular to the surface and which has the porosity of not more than 20%; and a process for separating the long-shaped electrode substrates into many pieces.

In the second to sixth methods, it is preferable that the porous thermal sprayed layer in which the thermal spraying materials are adhered to the surface which is horizontal to the thermal spraying direction is removed by grinding processing or fused by high density energy to be densified as mentioned thereafter.

The seventh method for producing the electrode comprises a process for forming a layer for preventing noise electric wave comprising the thermal sprayed layer which is formed on one surface of the electrode substrate, and in which thermal spraying is performed in the direction perpendicular to the surface, and which has the porosity of not more than 20%; and a process for fusing the thermal sprayed layer in which thermal spraying is performed on the other surface of the electrode substrate, and which has the porosity of more than 20% by means of high density energy to be densified.

In the first to seventh methods, when the thermal spraying is performed on the surface of the electrode substrate in the approximately perpendicular direction, the thermal spraying condition is not especially restricted if only the porosity of the thermal sprayed layer is not more than 20%.

The electrode for preventing noise electric wave for solving the above first and third objects comprises a substrate; a high-fusing conductive material layer which is formed on the surface of the substrate faced to the opposite electrode, and which has the resistivity of not more than $10^4$ ohm centimeters, the fusing point of not less than 2000° C., and the thickness of not more than 30 micron seconds; and not less than one resisting material layer which is coated on the surface of the high-fusing conductive material layer faced to the opposite electrode.

The following is the reason that the resistivity, the fusing point, and the thickness of the high-fusing conductive material layer are restricted.

When the resistivity of the high-fusing conductive material layer is larger than $10^4$ ohm centimeters, the discharge portion is moved to the side of the substrate. As a result, the concave portion is generated at the portion of the substrate which is near the boundary portion between the substrate and the high-fusing conductive material layer due to fused loss so that the performance is deteriorated. It is defined that the resistivity is always measured at the temperature of 20° C.

When the fusing point of the high-fusing conductive material layer is less than 2000° C., it is possible that the performance is deteriorated due to fused loss of the high-fusing conductive material layer itself. Furthermore, when the thickness of the high-fusing conductive material layer is less than 30 microns, the effect of the high-fusing conductive material layer cannot be obtained, and the heat from the discharge portion is moved to the substrate. Therefore, the concave portion is generated at the portion of the substrate which is near the boundary portion between the substrate and the high-fusing conductive material layer due to fused loss.

Materials of the high-fusing conductive material layer is not specially restricted if only the materials can satisfy the above conditions. Therefore, the high-fusing conductive material layer comprises not less than one kind of materials consisting of Mo (having the resistivity of $5.7\times10^{-6}$ ohm centimeters, and the fusing point of 2622° C.), Ta (having the resistivity of $13.5\times10^{-6}$ ohm centimeters and the fusing point of 2850° C.), W (having the resistivity of $5.5\times10^{-6}$ ohm centimeters and the fusing point of 3382° C.), $Cr_2O_3$ (having the resistivity of 10 to $10^2$ ohm centimeters and the fusing point of 2270° C.) and $CeO_2$ (having the resistivity of $10^3$ ohm centimeters and the fusing point of 2660° C.).

It is preferable that the substrate comprises copper or copper alloy. In the high-fusing conductive material layer, when the high density energy due to discharge is concentrated to accumulate heat, especially when the amount of accumulated heat increases at the time of high speed rotation, there is the possibility that the high-fusing conductive material layer is fused and damaged. Therefore, the substrate comprises copper or copper alloy having high heat conductivity so that outgoing radiation is promoted, thereby preventing the substrate from being fused and damaged.

Materials of the resisting material layer is not especially restricted. Therefore, the resisting material layer comprises an insulator of $Al_2O_3$, $SiO_2$, $ZrO_2$, MgO and the like, or a mixture of the insulator and a resistor of CuO, $Cr_2O_3$, NiO, ZnO, $TiO_2$ and the like.

The electrode for preventing noise electric wave for solving the above first and third objects comprises a substrate, a resisting material layer which is coated on the surface of the substrate faced to the opposite electrode. In this electrode, the substrate has a covering portion which is covered on the outer periphery of the resisting material layer and is located at the connecting portion between the substrate and the resisting material layer.

It is preferable that the shape of the covering portion of the substrate is circular form in order to cover the whole periphery of the resisting material layer. When the sectional form of the electrode is rectangular form in which the length of the long edge is remarkably longer than the length of the short edge, the covering portion can cover only the surfaces having wide area of the outer periphery of the resisting material layer.

It is preferable that the thickness of the covering portion of the substrate is not more than 0.34 mm. When the thickness of the covering portion is more than 0.34 mm, the covering portion is fused and damaged by the heat at the time of discharge. At the same time, the concave portion generated at the covering portion becomes deep, and noise electric wave becomes increasing.

The length of the covering portion of the substrate is determined in accordance with the endurance travel distance, but it is preferable that the length of the covering portion is not less than 0.1 mm. When the length of the covering portion is shorter than 0.1 mm, the covering portion is fused and damaged to be small. As a result, the discharge portion is generated from the substrate except the covering portion at the earlier stage so that the required performance cannot be obtained.

In the electrode for preventing noise electric wave, the material of the resisting material layer is the same as those of the resisting material layer in the electrode for preventing noise electric wave.

(Effects)

In the electrode for preventing noise electric wave, the second layer which is located at outside has larger resistivity than that of the first layer.

When the discharge occurs, the flow of electron in the oxide resistor continuously exists for a predetermined time. However, when electron is once emitted, the electronic supply performance at the top surface layer has an enormous influence on the current value. As a result, it is advantageous that the impedance of the second layer is high. In the electrode having the above construction, it is possible to prevent the generation of noise electric wave as compared with the conventional electrode having single layer comprising high electrical resistance substance.

In the electrode for preventing noise electric wave, discharge is generated from the oxide resistor (having lower resistance than that of the oxide dielectric substance) in the first layer at the time of voltage apply, but the oxide dielectric substance exists in the second layer. Therefore, discharge is generated from the upper and lower surfaces of the electrode, and current flows along the surface of the first and second layers to be creeping discharge. When electron is moved along the surface of the first and second layers having high electric resistance, energy of the discharge is damped and the generation of the electric field and magnetic field which causes noise can be decreased. Furthermore, since the second layer comprising oxide dielectric substance is formed on the first layer, the outflow of electron charged in the oxide resistor in the first layer can be prevented when the electron of the creeping discharge is moved from the electrode for preventing noise electric wave (cathode) to the opposite electrode (anode). When the outflow of electron charged in the oxide resistor in the first layer occurs, discharge current value is increased and noise electric wave is increased.

In the electrode for preventing noise electric wave, when the second layer comprising oxide dielectric substance is too thick, impedance of whole electrode is increased and discharge voltage is increased. As a result, the effect for preventing noise electric wave is deteriorated. Therefore, it is preferable that the thickness of the second layer is not more than 0.1 mm. In order to effectively demonstrate the effect of the above creeping discharge, the total thickness of the first layer and the second layer is in the range of 0.1 to 1.0 mm. When the total thickness of the first layer and the second layer is not less than 1.0 mm, impedance of whole electrode is increased. Furthermore, discharge is generated at the oxide resistor in the first layer from which discharge is likely to be generated, and at the field which is nearest to the opposite electrode. Namely, discharge is generated from the boundary portion between the first layer and the second layer, thereby deteriorating the effect of creeping discharge.

The electrode of the present invention is exposed to the high density energy due to the discharge. In the electrode, when the oxide dielectric substance of the second layer is used as a barrier for saving the discharge electron, large amounts of energy is absorbed, and the electrode sectionally becomes high temperature. As a result, when the oxide resistor having comparatively low fusing point such as CuO is used for the first layer, the oxide resistor are fused by the heat. Furthermore, when the electrode rotates at high speed like a rotor, the oxide dielectric substance of the second layer is also scattered to generate pin hole.

To prevent the above disadvantages, the oxide dielectric substance and the oxide resistor have preferably high fusing point. Inventors have found that the temperature at the time of discharge reaches 1300° to 1500° C. sectionally. Therefore, the oxide dielectric substance and the oxide resistor have preferably the fusing point of not less than 1500° C. The oxide dielectric substances include $Al_2O_3$, $ZrO_2$, MgO, BeO and so on. The oxide resistors include $TiO_2$, CaO, MnO, ZnO, BaO, $CeO_2$, NiO, CoO, $Fe_3O_4$, $Cr_2O_3$, $V_2O_3$ and so on.

However, in the case of the above composition, the pin hole is sometimes generated. So, in the electrode for firmly preventing the pin hole, the second layer comprises both the oxide dielectric substance and the oxide resistor. As a result, the resistivity value of the second layer is decreased as compared with the electrode. Furthermore, the performance of the barrier is deteriorated, and the absorbed energy can be decreased. Therefore, sectionally temperature rising of the electrode can be controlled, and it is possible to prevent the fusion of the resistor and the dielectric substance which causes the generation of the pin hole.

In the present invention, oxide is used for the resistor or the dielectric substance. When carbide or nitride is used for the resistor or the dielectric substance, the discharge in the atmosphere causes the deterioration of oxidation, and there are disadvantages in the durability of the performance for preventing noise electric wave.

In the electrodes of the present invention, it is preferable that the thickness of the first layer is in the range of 0.1 to 1.0 mm, and the total thickness of the first layer and the second layer is not more than 1.0 mm. When the thickness of the first layer is less than 0.1 mm, it is difficult to decrease the discharge voltage. When the total thickness of the first layer and the second layer is more than 1.0 mm, it is easy to cause coming-off or loss of the layer. In case of the rotor electrode, there are bad influence on the performance of the ignition of engine. Furthermore, in the described electrode, the effect of creeping discharge is deteriorated.

In the electrode for preventing noise electric wave, the second layer is formed on the surface of the first layer by performing oxidation treatment on the surface of the first layer. Therefore, this method has advantages in the cost as compared with plasma spraying method, ion plating method, sputtering method and so on.

In the electrodes for preventing noise electric wave, the layer for preventing noise electric wave comprising thermal sprayed layer is coated on the surface of the electrode substrate faced to the opposite electrode and has the porosity of not more than 20%. Therefore, the generation of the micro discharge at the porous portion of the thermal sprayed layer, which induces the induction discharge current having comparatively high absolute value level of the current value at the time of discharge to flow for a long time, can be controlled.

In the first method for producing the electrode, since the layer for preventing noise electric wave comprising the thermal sprayed layer and having the porosity of not more than 20% is confirmly formed only on the surface of the electrode substrate faced to the opposite electrode, it is possible to provide the electrode for preventing noise electric wave which can firmly prevent the generation of the micro discharge at the porous portion of the thermal sprayed layer.

In the second to fifth methods for producing the electrode, since thermal spraying is performed at each edge surface of a number of laminated electrode substrates, it is possible to prevent the formation of the porous thermal sprayed layer at least on the overlapping surface made by two neighboring electrode substrates. At the same time, it is possible to manufacture many electrodes productively.

In the third method for producing the electrode, the edge portion of each spacer located between laminated electrode substrates is projected from the edge surface of each electrode substrate by the predetermined length, and at the same time, thermal spraying is performed in such a manner that the thickness of the thermal sprayed layer is thinner than the above predetermined length. As a result, each layer for preventing noise electric wave formed on each electrode substrate is previously separated by each spacer. Therefore, it is possible to control coming-off of the layer at the time of separating the layer for preventing noise electric wave.

In the fourth method for producing the electrode, the substrate thermal spraying layer formed on the edge surface of each of the laminated electrode substrate is separated along a dividing line of electrode substrate, and then each electrode substrate is re-laminated. After that, the layer for preventing noise electric wave is formed on the separated substrate thermal spraying layer. As a result, when the layer for preventing noise electric wave is separated along the dividing line of each electrode substrate, a breaking portion of the substrate thermal spraying layer is the stress concentration point. Therefore, the layer for preventing noise electric wave is easily and firmly separated by the breaking portion.

In the fifth method for producing the electrode, thermal spraying is performed, and at the same time, the electrode substrate is swung in order to repeat relative displacement between two edge surfaces of two neighboring electrode substrates. As a result, the layer for preventing noise electric wave formed on each electrode substrate is not adhered to each other. Therefore, it is possible to omit the process for separating the layer for preventing noise electric wave, and to prevent coming-off of the layer in the process for separating the layer.

In the sixth method for producing the electrode, the layer for preventing noise electric wave is formed on one surface of long-shaped electrode substrate, and then the layer for preventing noise electric wave is cut into many pieces. Therefore, it is possible to prevent the formation of the porous thermal sprayed layer at least on the cut surface of each electrode substrate, and to manufacture many electrodes productively. Furthermore, it is possible to prevent coming-off or slippage of the layer since the layer for preventing noise electric wave is cut by machining.

In the seventh method for producing the electrode, the porous thermal sprayed layer formed on the surface of the electrode substrate which is horizontal to the thermal spraying direction is fused by high density energy to be densified, and the porous portion of the thermal sprayed layer is firmly omitted. Therefore, it is possible to provide the electrode for preventing noise electric wave which can firmly prevent the generation of the micro discharge at the porous portion of the thermal sprayed layer.

In the electrode for preventing noise electric wave, the high-fusing conductive material layer having special resistivity, fusing point and thickness exists between the substrate and the resisting material layer. As a result, since discharge is generated from the high-fusing conductive material layer, not from the substrate, the substrate having comparatively low fusing point is hardly fused and damaged by the heat at the time of discharge. Therefore, it is possible to prevent the formation of the concave portion which causes the increase in noise electric wave on the surface of the substrate. Furthermore, since the high-fusing conductive material layer has high fusing point, the high-fusing conductive material is hardly fused and damaged by the heat, and the concave portion is hardly formed on the high-fusing conductive material layer.

When the substrate comprises copper or copper alloy having high heat conductivity, the radiation effect from the substrate can be obtained since copper or copper alloy has high heat conductivity. Therefore, it is possible to control the concentration of the high density energy due to discharge at the high-fusing conductive material layer, and to decrease the possibility that the high-fusing conductive material layer is fused and damaged.

In the electrode for preventing noise electric wave, the substrate has the covering portion which is covered on the outer periphery of the resisting material layer and is located at the connecting portion between the substrate and the resisting material layer. At the portion of the covering portion which is near a boundary portion between the tip portion of the covering portion and the resisting material layer, discharge is generated. At this time, the covering portion is fused and damaged by the heat at the time of discharge, but the resisting material layer located at the lower surface of the covering portion is less fused and damaged since the resisting material has higher fusing point than that of the base material. Therefore, the damage of fused loss which causes the increase in noise electric wave is checked by the thickness of the covering portion, and the concave portion is hardly formed at the resisting material layer.

When the thickness of the covering portion of the substrate is not more than 0.34 mm, noise electric wave is hardly increased due to the influence of fused loss on the covering portion which is caused by the heat at the time of discharge.

When the coating portion of the substrate is not less than 0.1 mm, it is possible to extend the period that discharge is generated from the substrate except the coating portion which becomes gradually small. Therefore, it is possible to improve the durability.

BRIEF DESCRIPTION OF THE DRAWINGS

A more complete appreciation of the present invention and many of its advantages will be readily obtained as the same becomes better understood by reference to the following detailed description when considered in connection with the accompanying drawings and detailed specification, all of which forms a part of the disclosure.

DETAILED DESCRIPTION OF THE PREFERRED EMBODIMENTS

Having generally described the present invention, a further understanding can be obtained by reference to the specific preferred embodiment which is provided herein for purposes of illustration only and is not intended to limit the scope of the appended claims.

Figure 2:
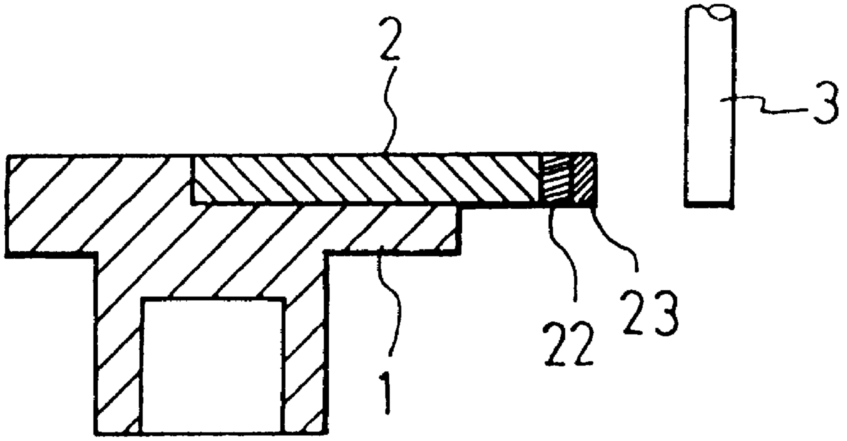
FIG. 2 is a whole cross-sectional view for showing the electrode for preventing noise electric wave according to the First Preferred Embodiment of the present invention.

In the following preferred embodiments, the present invention is applied for a rotor electrode of distributor of automobiles. FIG. 2 is a whole schematic diagram of this electrode. The distributor comprises a rotor 1 which is rotatable at high speed, a rotor electrode 2 which is installed on the rotor 1 and a side electrode 3 which is opposite to the tip of the rotor electrode 2 with the clearance therebetween.

First Preferred Embodiment

Embodiment 1

Figure 1:
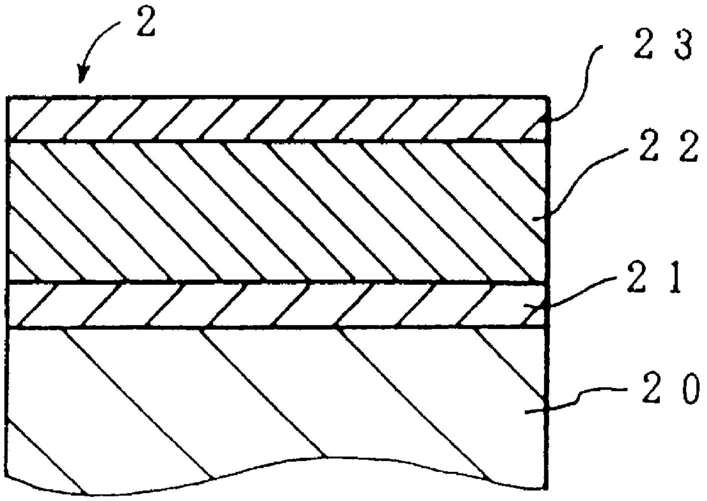
FIG. 1 is a main cross-sectional view for showing the electrode for preventing noise electric wave according to the First Preferred Embodiment of the present invention.

FIG. 1 is a cross-sectional view for showing the rotor electrode 2 according to the Embodiment 1. The rotor electrode 2 comprises a substrate 20 made of brass, a substrate layer 21 formed on the surface of the substrate 20, a first layer 22 formed and coated on the surface of the substrate layer 21 and a second layer 23 formed and coated on the surface of the first layer 22.

The substrate layer 21 is formed in such a manner that the first layer 22 is firmly adhered to the substrate 20 by thermal spraying. The substrate layer 21 is made of Ni-5% Al alloy and has the thickness of 100 microns. The substrate layer 21 is formed by plasma spraying method.

The first layer 22 is made of CuO as oxide resistor and has the thickness of 200 microns. The resistivity value $R_1$ of the first layer 22 is in the range of $10^3$ to $10^4$ ohm centimeters.

The second layer 23 is made of BaO as oxide resistor and has the thickness of 200 microns. The resistivity value $R_2$ of the second layer 23 is in the range of $10^9$ to $10^{10}$ ohm centimeters. Therefore, $R_2$ is larger than $R_1$.

Both the first layer 22 and the second layer 23 are formed by plasma spraying method.

Comparative Example 1

An electrode according to Comparative Example 1 comprises only a substrate 20.

Comparative Example 2

An electrode according to Comparative Example 2 has the same construction as that of the Embodiment 1 except that the second layer 23 is not existed.

Comparative Example 3

An electrode according to Comparative Example 3 has the same construction as that of the Embodiment 1 except that the first layer 22 formed on the surface of the substrate layer 21 is made of BaO and has the thickness of 200 microns, and that the second layer 23 is not existed.

Comparative Example 4

An electrode according to Comparative Example 4 has the same construction as that of the Embodiment 1 except that the first layer 22 formed on the surface of the substrate layer 21 is made of BaO and has the thickness of 200 microns, and that the second layer 23 is made of CuO and has the thickness of 200 microns. In this case, the resistivity value $R_2$ of the second layer 23 is smaller than the resistivity value $R_1$ of the first layer 22.

(Evaluation)

Figure 3:
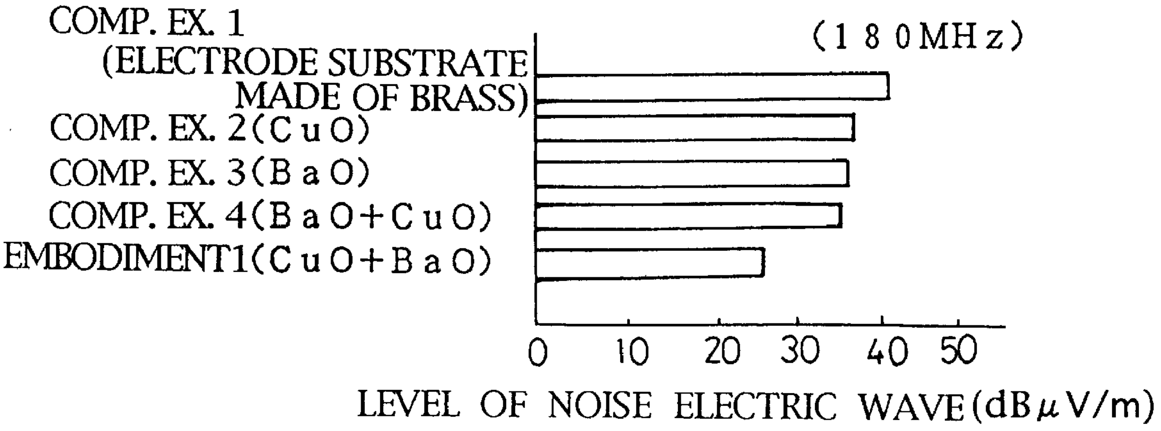
FIG. 3 is a bar graph for showing the level of noise electric wave of the electrode according to the First Preferred Embodiment of the present invention.

FIG. 3 shows the result of measuring the level of noise electric wave at the time of discharge concerning each electrode. As seen from FIG. 3, the electrode according to the Embodiment 1 shows the most excellent effect for preventing noise electric wave. As seen from Comparative Example 4, when the first layer 22 and the second layer 23 in the Embodiment 1 are exchanged with each other, there is no effect for preventing noise electric wave.

Figure 4:
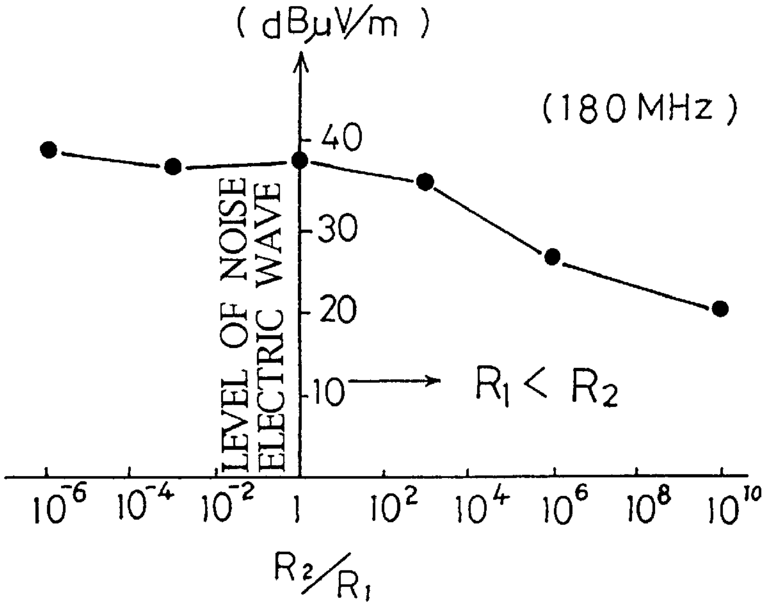
FIG. 4 is a graph for showing the relationship between the level of noise electric wave and the ratio of the resistivity of the second layer to the resistivity of the first layer according to the First Preferred Embodiment of the present invention.

FIG. 4 shows the change of the level of noise electric wave when the ratio of $R_2$ to $R_1$ ($R_2/R_1$) is variously changed. As seen from FIG. 4, when $R_1$ is larger than or equal to $R_2$, there is no effect for preventing noise electric wave. Furthermore, when $R_2$ is larger than $R_1$, there is remarkable effect for preventing noise electric wave.

Second Preferred Embodiment

Embodiment 2

An electrode according to the Embodiment 2 has the same construction as that of the Embodiment 1 except that the construction of the first layer 22 and the second layer 23 is different. The first layer 22 is made of the mixture comprising $Al_2O_3$ as oxide dielectric substance and CuO as oxide resistor, and the weight ratio of $Al_2O_3$ to CuO is 4:6. The first layer 22 has the thickness of 400 microns, and the resistivity value is in the range of $10^4$ to $10^6$ ohm centimeters.

The second layer 23 is made of only $Al_2O_3$ as oxide dielectric substance. The second layer 23 has the thickness of 50 microns, and the resistivity value is $10^{14}$ ohm centimeters. The second layer 23 has the larger resistivity than that of the first layer 22.

Both the first layer 22 and the second layer 23 are formed by plasma spraying method which is the same method as that in the Embodiment 1.

Comparative Example 1

An electrode according to Comparative Example 1 comprises only a substrate 20.

Comparative Example 5

An electrode according to Comparative Example 5 has the same construction as that of the Embodiment 2 except that the second layer 23 is not existed.

Comparative Example 6

An electrode according to Comparative Example 6 has the same construction as that of the Embodiment 1 except that an insulation layer is formed on the surface of the substrate layer 21 in order to propagate electric power by use of creeping discharge. The insulation layer is made of $Al_2O_3$ and has the thickness of 400 microns.

(Evaluation)

Figure 5:
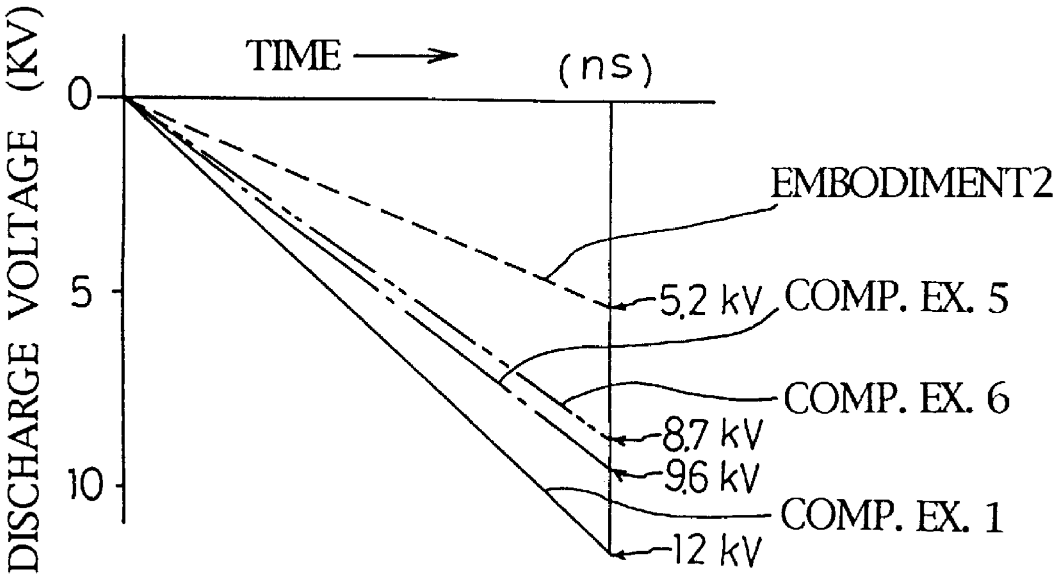
FIG. 5 is a graph for showing the degree of the discharge voltage of the electrode according to the Second Preferred Embodiment of the present invention.
Figure 6:
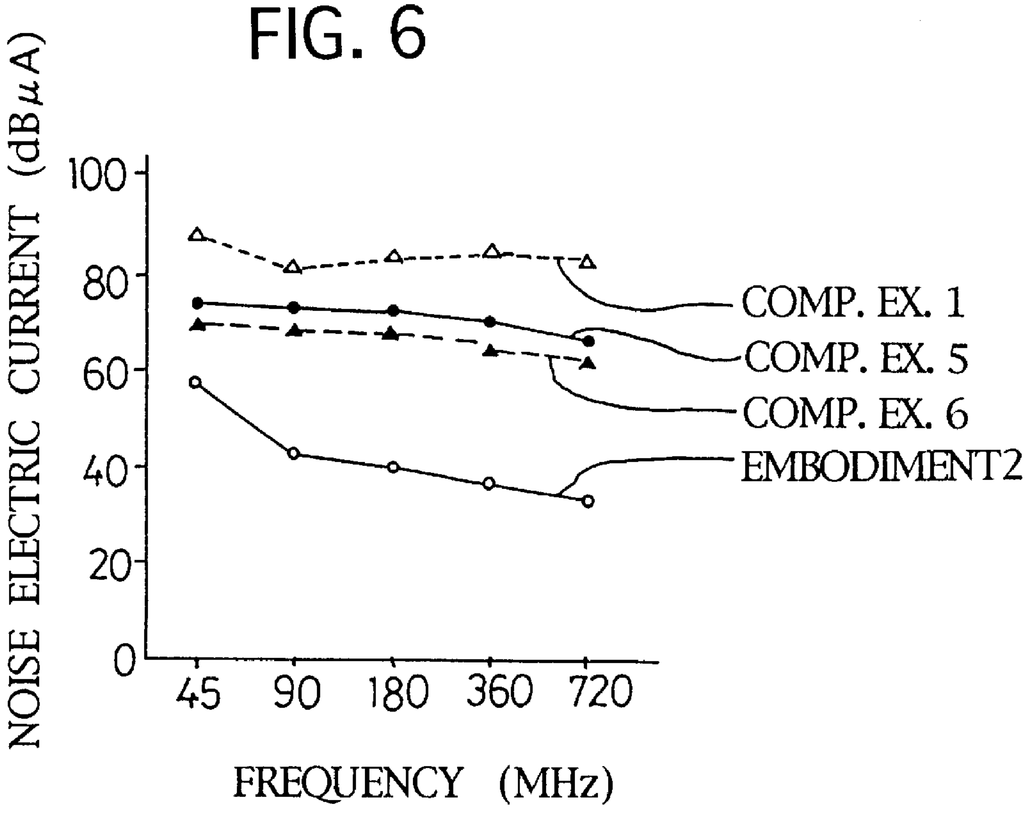
FIG. 6 is a graph for showing the degree of the noise electric current of the electrode according to the Second Preferred Embodiment of the present invention.
Figure 7:
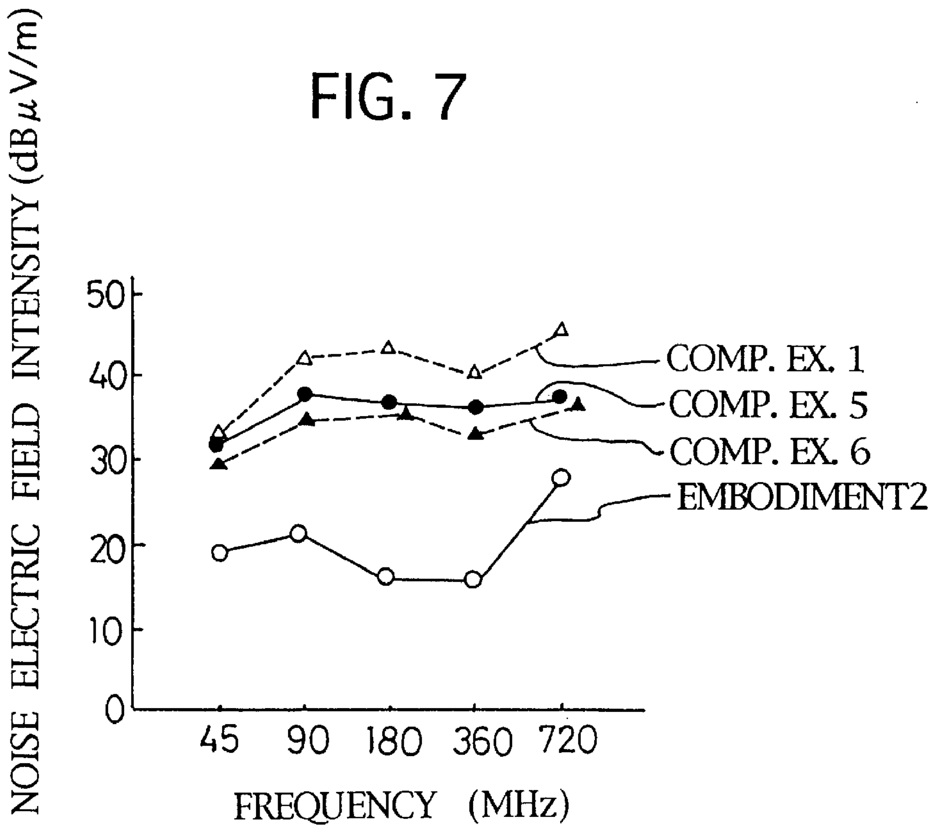
FIG. 7 is a graph for showing the degree of the noise electric field intensity of the electrode according to the Second Preferred Embodiment of the present invention.

Concerning each electrode, the discharge voltage, noise electric current and noise electric field intensity were measured. The result is shown in FIGS. 5, 6 and 7.

As seen from these figures, both the discharge voltage and noise electric current of the Embodiment 2 are controlled to be low. As a result, noise electric field intensity is remarkably decreased. As compared with Comparative Examples 5 and 6, the electrode of the Embodiment 2 has about 2.5 to 3 times effect for decreasing noise electric wave.

Third Preferred Embodiment

Embodiment 3

Figure 8:
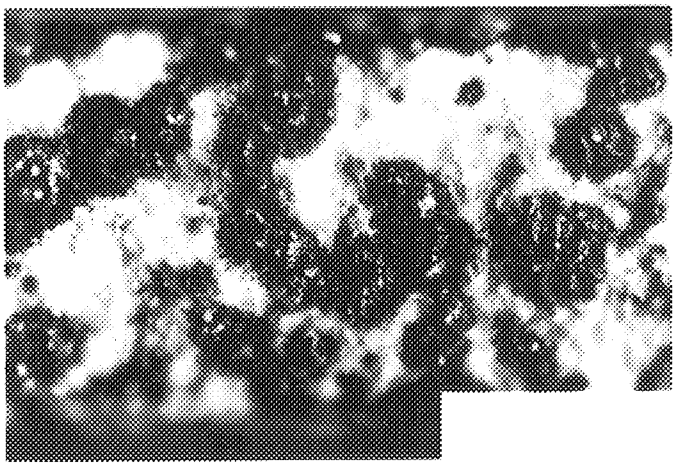
FIG. 8 is an enlarged photograph for showing the particle structure on the surface of the second layer of the electrode according to the Second Preferred Embodiment of the present invention after the electrode is used.

When the electrode of Embodiment 2 is used, as shown in FIG. 8, a number of pin holes (circle and black portions) are generated on the surface of the second layer 23, and the effect for preventing noise electric wave is gradually decreased. Therefore, an electrode according to the Embodiment 3 has the same construction as that of the Embodiment 1 except that the first layer 22 is made of electromelting grinding material such as $Al_2O_3$-13% $TiO_2$ (in case of not more than 44% $TiO_2$, it exists as $Al_2TiO_5$ and $Al_2O_3$) and has the thickness of 20 microns, and that the second layer is made of $Al_2O_3$ and has the thickness of 50 microns.

The electromelting grinding material comprising $Al_2O_3$-13% $TiO_2$ is now put on the market, and it is excellent in its uniformity of dispersion and the cost. When the electromelting grinding material is used as the first layer, it is possible to manufacture the electrode for preventing noise electric wave having excellent performance inexpensively.

Embodiment 4

An electrode according to the Embodiment 4 has the same construction as that of the Embodiment 3 except that the thickness of the first layer 22 is 70 microns.

Embodiment 5

An electrode according to the Embodiment 5 has the same construction as that of the Embodiment 3 except that the thickness of the first layer 22 is 100 microns.

Embodiment 6

An electrode according to the Embodiment 6 has the same construction as that of the Embodiment 3 except that the thickness of the first layer 22 is 200 microns.

Embodiment 7

An electrode according to the Embodiment 7 has the same construction as that of the Embodiment 3 except that the thickness of the first layer 22 is 800 microns.

Embodiment 8

An electrode according to the Embodiment 8 has the same construction as that of the Embodiment 3 except that the thickness of the first layer 22 is 400 microns, and that the thickness of the second layer 23 is 20 microns.

Embodiment 9

An electrode according to the Embodiment 9 has the same construction as that of the Embodiment 3 except that the thickness of the first layer 22 is 400 microns.

Embodiment 10

An electrode according to the Embodiment 10 has the same construction as that of the Embodiment 3 except that the thickness of the first layer 22 is 400 microns, and that the thickness of the second layer 23 is 100 microns.

Embodiment 11

An electrode according to the Embodiment 11 has the same construction as that of the Embodiment 3 except that the thickness of the first layer 22 is 400 microns, and that the thickness of the second layer 23 is 200 microns.

Embodiment 12

An electrode according to the Embodiment 12 has the same construction as that of the Embodiment 3 except that the thickness of the first layer 22 is 400 microns, and that the thickness of the second layer 23 is 400 microns.

Comparative Example 1

An electrode according to Comparative Example 1 comprises only a substrate 20.

Embodiment 13

An electrode according to the Embodiment 13 has the same construction as that of the Embodiment 3 except that the first layer 22 is made of the mixture comprising $Al_2O_3$ and CuO (the weight ratio of $Al_2O_3$ to CuO being 4 to 6) and has the thickness of 400 microns, and that the thickness of the second layer 23 is 100 microns.

Embodiment 14

An electrode according to the Embodiment 14 has the same construction as that of the Embodiment 3 except that the first layer 22 is made of the mixture comprising $Al_2O_3$ and CuO (the weight ratio of $Al_2O_3$ to CuO being 4 to 6) and has the thickness of 400 microns, and that the thickness of the second layer 23 is 200 microns.

(Evaluation)

Figure 9:
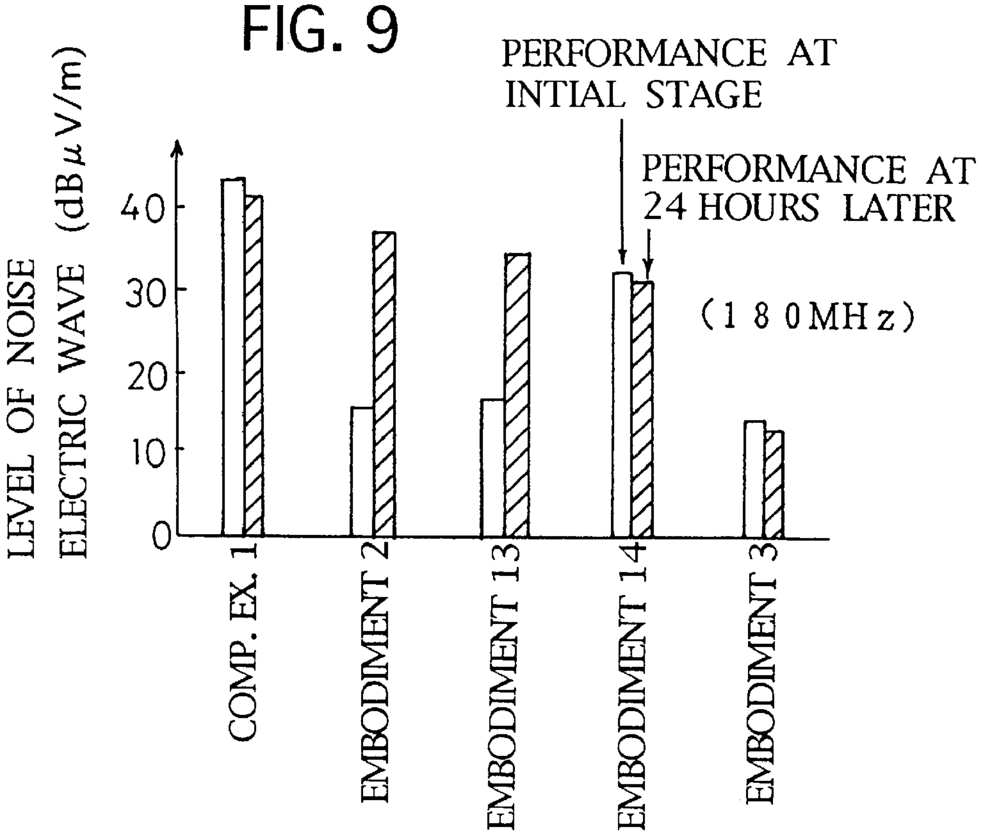
FIG. 9 is a bar graph for showing the level of noise electric wave of the electrode according to the Third Preferred Embodiment of the present invention.
Figure 10:
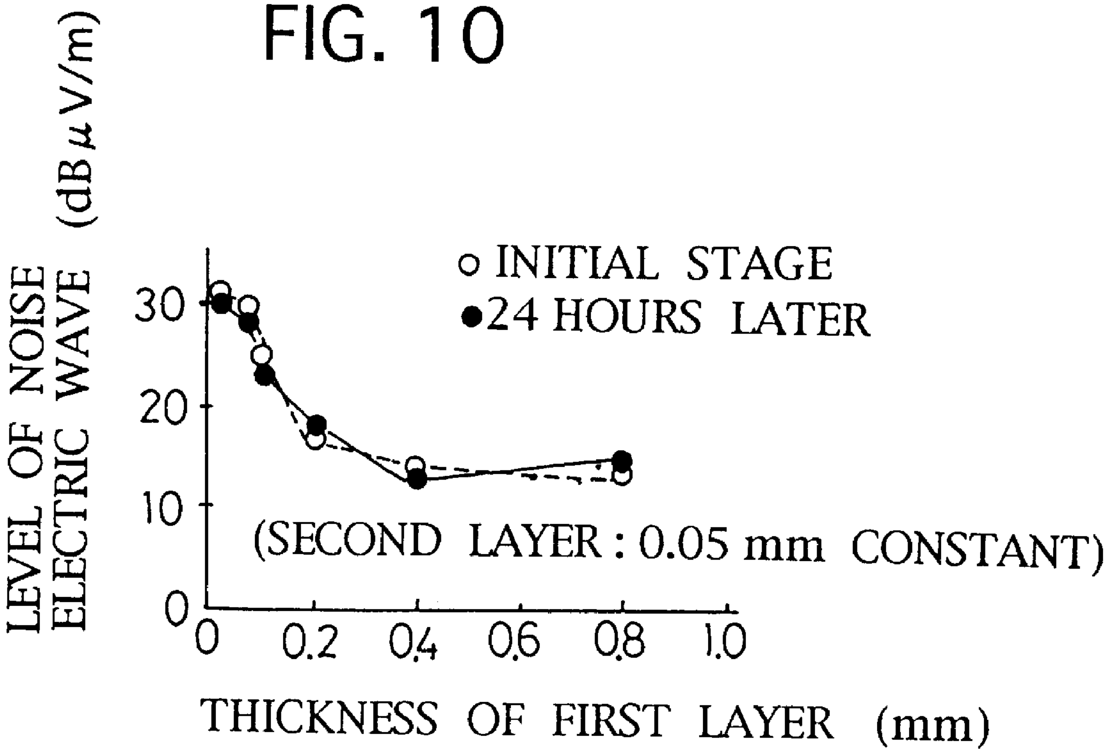
FIG. 10 is a graph for showing the relationship between the level of noise electric wave and the thickness of the first layer according to the Third Preferred Embodiment of the present invention.
Figure 11:
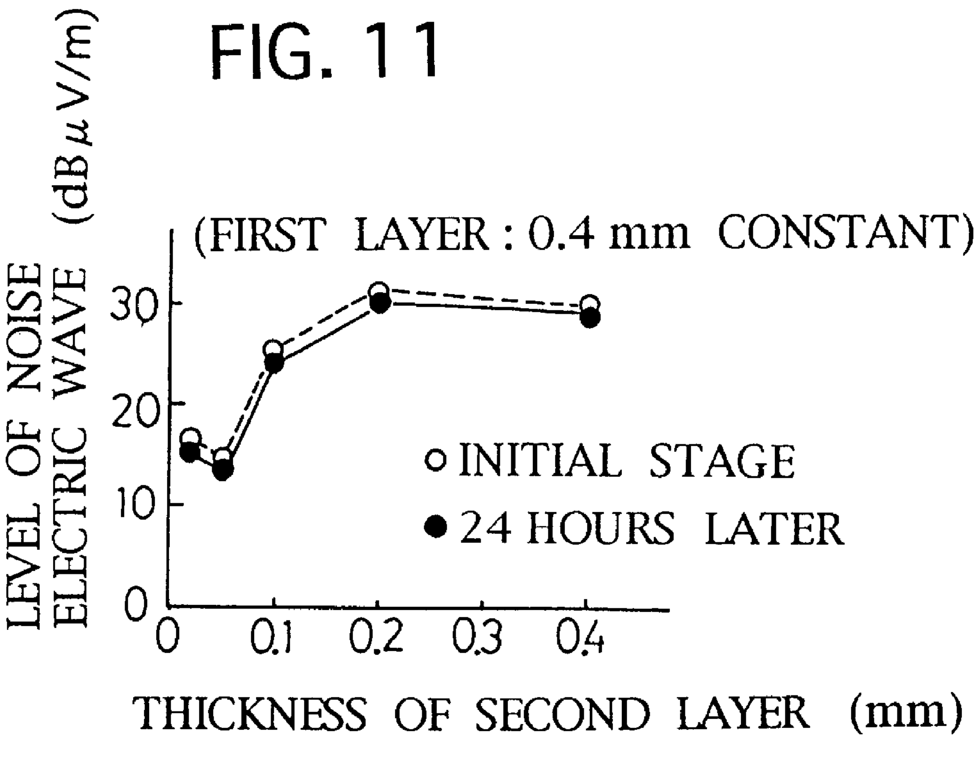
FIG. 11 is a graph for showing the relationship between the level of noise electric wave and the thickness of the second layer according to the Third Preferred Embodiment of the present invention.

Concerning each electrode, the decreasing amount of the level of noise electric wave (decreasing amount of noise) having 180 MHz was measured at the initial stage and at 24 hours later. Furthermore, it was observed that the pin hole was generated or not after the electrode was used. The result is shown in Table 1 and FIG. 9. FIG. 10 shows the relationship between the thickness of the first layer 22 and the level of noise electric wave having 180 MHz, and FIG. 11 shows the relationship between the thickness of the second layer 23 and the level of noise electric wave having 180 MHz. The decreasing amount of noise is calculated on the basis of the initial performance of the electrode of Comparative Example 1.

The electrode according to the Embodiment 3 shows the low level of noise electric wave at the initial stage and at 24 hours later. On the contrary, the electrode according to the Embodiments 2 and 13 shows low level of noise electric wave at the initial stage, but noise electric wave becomes increasing at 24 hours later. This is caused by the generation of pin hole. When the second layer 23 is made of only $Al_2O_3$ as oxide dielectric substance, pin hole is generated under the condition that CuO having comparatively low fusing point is included in the first layer 22.

In the Embodiment 14, no pin hole is generated and noise electric wave shows the same level at the initial stage and at 24 hours later. However, the level of noise electric wave is high since the thickness of the second layer 23 is thick. As seen from FIGS. 10 and 11, there is an appropriate thickness for preventing noise electric wave. The thickness of the first layer 22 is preferably not less than 0.1 mm, more preferably, not less than 0.2 mm. The thickness of the second layer 23 is preferably not more than 0.1 mm, more preferably, not more than 0.05 mm.

TABLE 1

| | First Layer | | Second Layer | | Decreasing Amount of Noise | Decreasing Amount of Noise | Generation |
|---|---|---|---|---|---|---|---|
| | Material | Thickness (mm) | Material | Thickness (mm) | at Initial Stage (dB) | after 24 Hours (dB) | of Pin Hole |
| Com. Ex. 1 | — | — | — | — | Standard | −2 | — |
| Embod. 2 | $Al_2O_3$ + CuO | 0.4 | $Al_2O_{3(99.6\%)}$ | 0.05 | −26 | −6 | Yes |
| Embod. 13 | $Al_2O_3$ + CuO | 0.4 | $Al_2O_{3(99.6\%)}$ | 0.1 | −25 | −8 | Yes |
| Embod. 14 | $Al_2O_3$ + CuO | 0.4 | $Al_2O_{3(99.6\%)}$ | 0.2 | −10 | −11 | No |
| Embod. 3 | $Al_2O_3$(13% $TiO_2$) | 0.02 | $Al_2O_{3(99.6\%)}$ | 0.5 | −10 | −11 | No |
| Embod. 4 | $Al_2O_3$(13% $TiO_2$) | 0.07 | $Al_2O_3$(99.6%) | 0.05 | −11 | −13 | No |
| Embod. 5 | $Al_2O_3$(13% $TiO_2$) | 0.1 | $Al_2O_3$(99.6%) | 0.05 | −16 | −18 | No |
| Embod. 6 | $Al_2O_3$(13% $TiO_2$) | 0.2 | $Al_2O_3$(99.6%) | 0.05 | −24 | −23 | No |
| Embod. 7 | $Al_2O_3$(13% $TiO_2$) | 0.8 | $Al_2O_3$(99.6%) | 0.05 | −28 | −27 | No |
| Embod. 8 | $Al_2O_3$(13% $TiO_2$) | 0.4 | $Al_2O_3$(99.6%) | 0.02 | −25 | −26 | No |
| Embod. 9 | $Al_2O_3$(13% $TiO_2$) | 0.4 | $Al_2O_3$(99.6%) | 0.05 | −27 | −28 | No |
| Embod. 10 | $Al_2O_3$(13% $TiO_2$) | 0.4 | $Al_2O_3$(99.6%) | 0.11 | −16 | −17 | No |
| Embod. 11 | $Al_2O_3$(13% $TiO_2$) | 0.4 | $Al_2O_3$(99.6%) | 0.2 | −10 | −11 | No |
| Embod. 12 | $Al_2O_3$(13% $TiO_2$) | 0.4 | $Al_2O_3$(99.6%) | 0.4 | −11 | −12 | No |

Fourth Preferred Embodiment

Embodiment 15

An electrode according to the Embodiment 15 has the same construction as that of the Embodiment 2 except that the second layer 23 is made of electromelting grinding material ($Al_2O_3$-2.3% $TiO_2$) as semi-conductive alumina and has the thickness of 50 microns.

Embodiment 16

An electrode according to the Embodiment 16 has the same construction as that of the Embodiment 15 except that the amount of $TiO_2$ in the second layer 23 is 5%.

Embodiment 17

An electrode according to the Embodiment 17 has the same construction as that of the Embodiment 15 except that the thickness of the first layer 22 is 20 microns, and that the amount of $TiO_2$ in the second layer 23 is 13%.

Embodiment 18

An electrode according to the Embodiment 18 has the same construction as that of the Embodiment 15 except that the thickness of the first layer 22 is 70 microns, and that the amount of $TiO_2$ in the second layer 23 is 13%.

Embodiment 19

An electrode according to the Embodiment 19 has the same construction as that of the Embodiment 15 except that the thickness of the first layer 22 is 100 microns, and that the amount of $TiO_2$ in the second layer 23 is 13%.

Embodiment 20

An electrode according to the Embodiment 20 has the same construction as that of the Embodiment 15 except that the amount of $TiO_2$ in the second layer 23 is 13%.

Embodiment 21

An electrode according to the Embodiment 21 has the same construction as that of the Embodiment 15 except that the thickness of the first layer 22 is 800 microns, and that the amount of $TiO_2$ in the second layer 23 is 13%.

Embodiment 22

An electrode according to the Embodiment 22 has the same construction as that of the Embodiment 15 except that the amount of $TiO_2$ in the second layer 23 is 30%.

Embodiment 23

An electrode according to the Embodiment 23 has the same construction as that of the Embodiment 15 except that the amount of $TiO_2$ in the second layer 23 is 44%.

Comparative Example 7

An electrode according to Comparative Example 7 has the same construction as that of the Embodiment 15 except that the second layer is made of 99% $TiO_2$.

Comparative Example 1

An electrode according to Comparative Example 1 comprises only a substrate 20.

Embodiment 2

An electrode according to the Embodiment 2 has the same construction as that of the Embodiment 1 except that the construction of the first layer 22 and the second layer 23 is different. The first layer 22 is made of the mixture comprising $Al_2O_3$ as oxide dielectric substance and CuO as oxide resistor, and the weight ratio of $Al_2O_3$ to CuO is 4:6. The first layer 22 has the thickness of 400 microns, and the direct current resistance value is in the range of $10^{4}$ to $10^6$ ohm centimeters.

The second layer 23 is made of only $Al_2O_3$ as oxide dielectric substance. The second layer 23 has the thickness of 50 microns, and the direct current resistance value is $10^{14}$ ohm centimeters. The direct current resistance value is measured instead of the resistivity, but the second layer 23 has the larger resistivity than that of the first layer 22.

Embodiment 13

An electrode according to the Embodiment 13 has the same construction as that of the Embodiment 2 except that the thickness of the second layer 23 is 100 microns.

Embodiment 14

An electrode according to the Embodiment 14 has the same construction as that of the Embodiment 2 except that the thickness of the second layer 23 is 200 microns.

Embodiment 25

An electrode according to the Embodiment 25 has the same construction as that of the Embodiment 2 except that the thickness of the second layer 23 is 20 microns.

(Evaluation)

Figure 12:
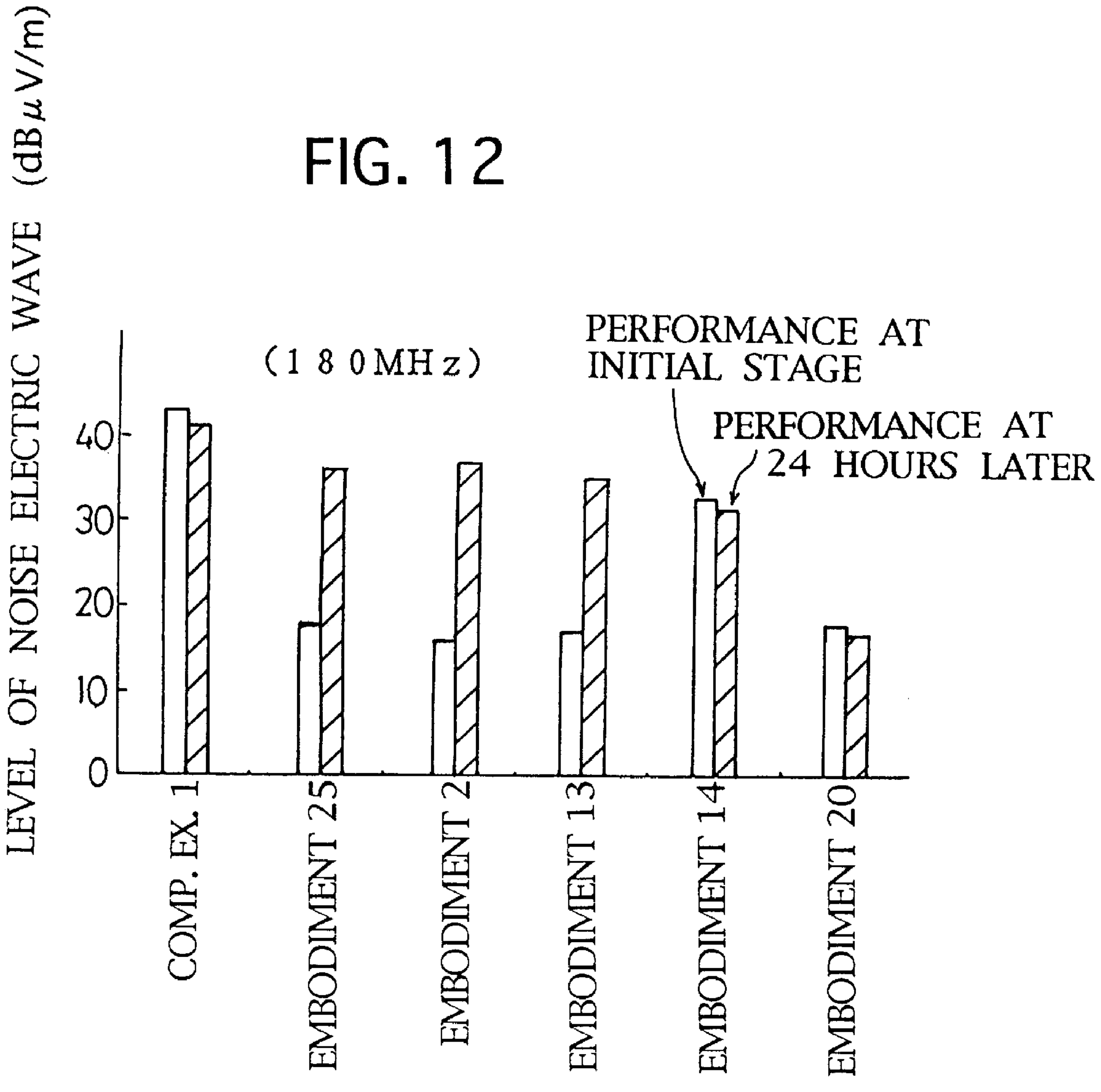
FIG. 12 is a bar graph for showing the level of noise electric wave of the electrode according to the Fourth Preferred Embodiment of the present invention.
Figure 13:
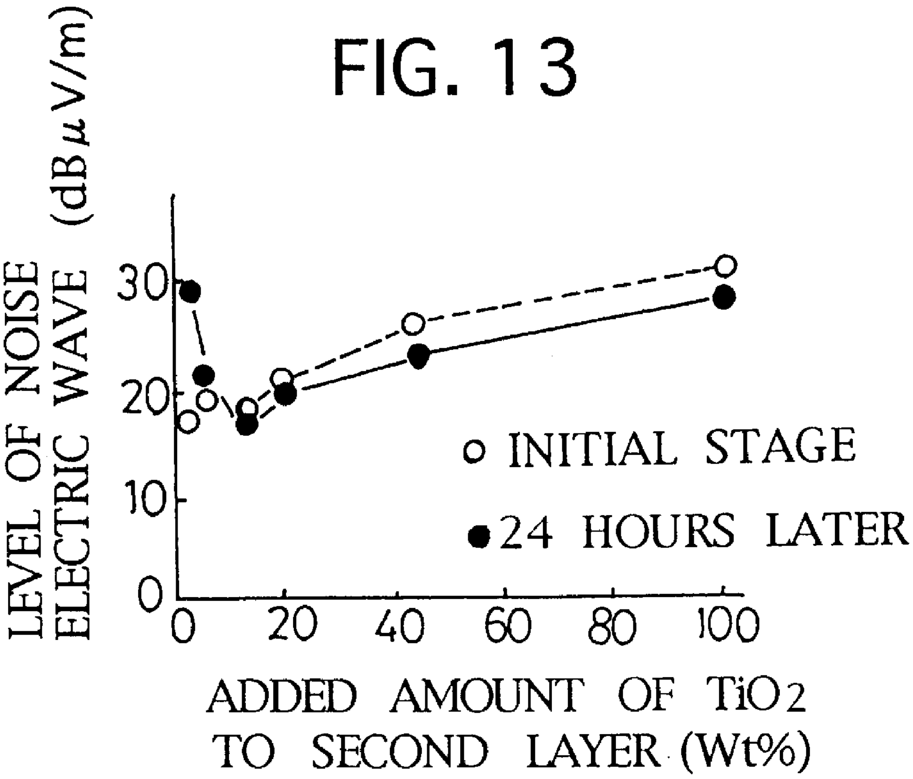
FIG. 13 is a graph for showing the relationship between the level of noise electric wave and the amount of $TiO_2$ according to the Fourth Preferred Embodiment of the present invention.
Figure 14:
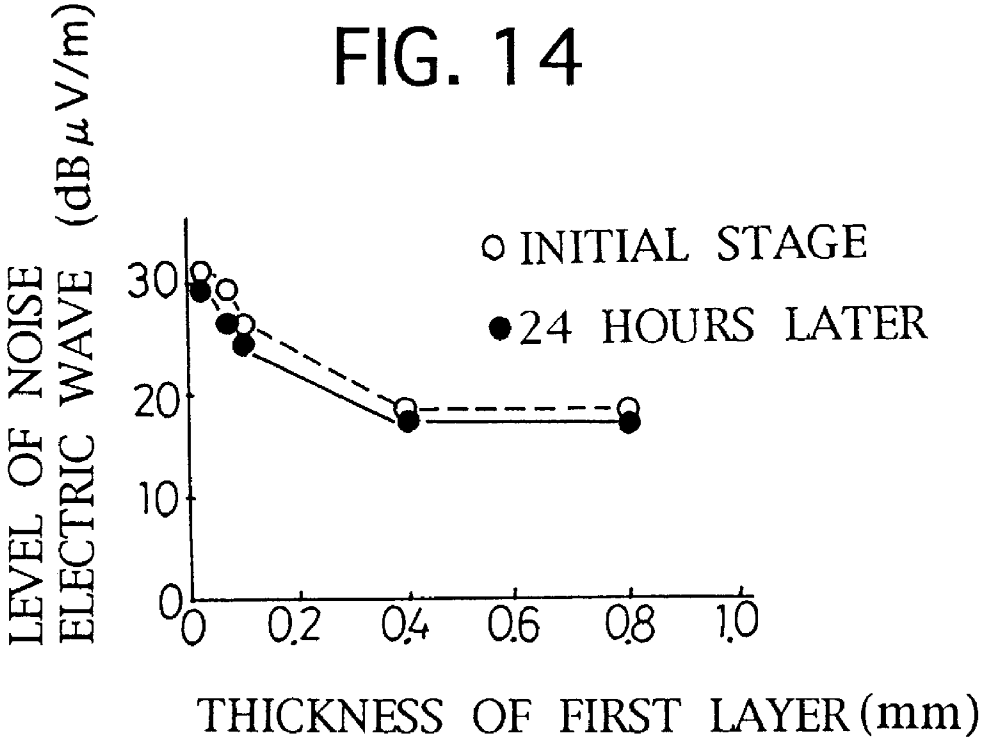
FIG. 14 is a graph for showing the relationship between the level of noise electric wave and the thickness of the first layer according to the Fourth Preferred Embodiment of the present invention.

Concerning each electrode, the decreasing amount of the level of noise electric wave (decreasing amount of noise) having 180 MHz was measured at the initial stage and at 24 hours later. Furthermore, it was observed that the pin hole was generated or not after the electrode was used. The result is shown in Table 2 and FIG. 12. FIG. 13 shows the relationship between the added amount of $TiO_2$ to the second layer 23 and the level of noise electric wave having 180 MHz, and FIG. 14 shows the relationship between the thickness of the first layer 22 and the level of noise electric wave having 180 MHz. The decreasing amount of noise is calculated on the basis of the initial performance of the electrode of Comparative Example 1.

The electrode according to the Embodiment 20 shows the low level of noise electric wave at the initial stage and at 24 hours later. On the contrary, the electrode according to the Embodiments 2, 13 and 25 shows low level of noise electric wave at the initial stage, but noise electric wave becomes increasing at 24 hours later. This is caused by the generation of pin hole. Although the first layer 22 includes CuO having comparatively low fusing point, pin hole is hardly generated when the second layer 23 is made of $Al_2O_3$ as oxide dielectric substance and $TiO_2$ as oxide resistor.

In the Embodiment 14, no pin hole is generated and noise electric wave shows the same level at the initial stage and at 24 hours later. However, the level of noise electric wave is high since the thickness of the second layer 23 is thick. As seen from FIGS. 13 and 14, there is an appropriate thickness of the first layer 22 and an appropriate added amount of $TiO_2$ for preventing noise electric wave. The added amount of $TiO_2$ is preferably in the range of 5 to 44%, more preferably, in the range of 5 to 22%. Furthermore, it is preferable that the thickness of the first layer is not less than 0.1 mm, more preferably, not less than 0.4 mm.

TABLE 2

| | First Layer | | Second Layer | | Decreasing Amount of Noise | Decreasing Amount of Noise | Generation |
|---|---|---|---|---|---|---|---|
| | Material | Thickness (mm) | Material | Thickness (mm) | at Initial Stage (dB) | after 24 Hours (dB) | of Pin Hole |
| Com. Ex. 1 | — | — | — | — | Standard | −2 | — |
| Embod. 25 | $Al_2O_3$ + CuO | 0.4 | $Al_2O_3$(99.6%) | 0.02 | −24 | −7 | Yes |
| Embod. 2 | $Al_2O_3$ + CuO | 0.4 | $Al_2O_3$(99.6%) | 0.05 | −26 | −6 | Yes |
| Embod. 13 | $Al_2O_3$ + CuO | 0.4 | $Al_2O_3$(99.6%) | 0.1 | −25 | −8 | Yes |
| Embod. 14 | $Al_2O_3$ + CuO | 0.4 | $Al_2O_3$(99.6%) | 0.2 | −10 | −11 | No |
| Embod. 15 | $Al_2O_3$ + CuO | 0.4 | $Al_2O_3$(2.3% $TiO_2$) | 0.05 | −25 | −13 | Yes |
| Embod. 16 | $Al_2O_3$ + CuO | 0.4 | $Al_2O_3$(5% $TiO_2$) | 0.05 | −23 | −21 | No |
| Embod. 17 | $Al_2O_3$ + CuO | 0.02 | $Al_2O_3$(13% $TiO_2$) | 0.05 | −11 | −13 | No |
| Ewbod. 18 | $Al_2O_3$ + CuO | 0.07 | $Al_2O_3$(13% $TiO_2$) | 0.05 | −13 | −16 | No |
| Embod. 19 | $Al_2O_3$ + CuO | 0.1 | $Al_2O_3$(13% $TiO_2$) | 0.05 | −16 | −18 | No |
| Embod. 20 | $Al_2O_3$ + CuO | 0.4 | $Al_2O_3$(13% $TiO_2$) | 0.05 | −24 | −25 | No |
| Embod. 21 | $Al_2O_3$ + CuO | 0.8 | $Al_2O_3$(13% $TiO_2$) | 0.05 | −24 | −25 | No |
| Embod. 22 | $Al_2O_3$ + CuO | 0.4 | $Al_2O_3$(30% $TiO_2$) | 0.05 | −21 | −22 | No |
| Embod. 23 | $Al_2O_3$ + CuO | 0.4 | $Al_2O_3$(44% $TiO_2$) | 0.05 | −16 | −19 | No |
| Com. Ex. 7 | $Al_2O_3$ + CuO | 0.4 | $TiO_2$(99%) | 0.05 | −11 | −14 | No |

Fifth Preferred Embodiment

Figure 15:
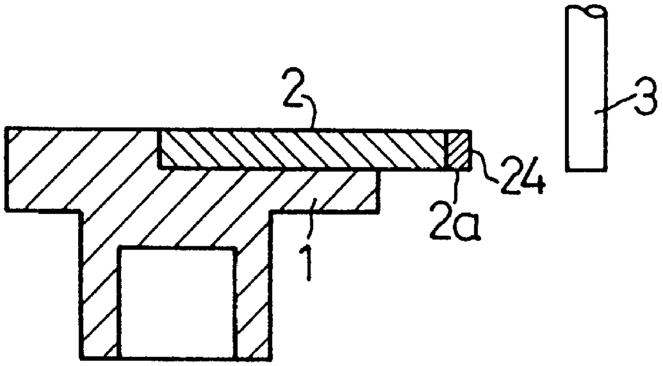
FIG. 15 is a whole cross-sectional view for showing the electrode for preventing noise electric wave according to the Fifth Preferred Embodiment of the present invention.

As shown in FIG. 15, the distributor according to the Fifth Preferred Embodiment comprises a rotor 1 which is rotatable at high speed, a T-shaped and planar rotor electrode 2 which is disposed at the rotor 1, and a side electrode 3 which is faced to the tip of the rotor electrode 2 with the clearance therebetween. A layer 2*a* for preventing noise electric wave comprising a thermal sprayed layer which is coated by thermal spraying is formed on the edge surface of the rotor electrode 2 which is faced to the side electrode 3.

Embodiment 26

In the Embodiment 26, a rotor electrode 2 as the electrode for preventing noise electric wave is manufactured by the first method according to claim 7.

Figure 16:
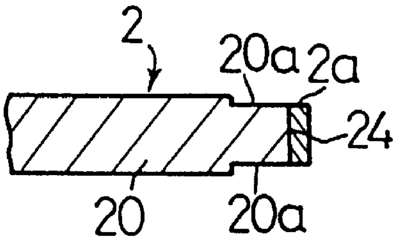
FIG. 16 is a main cross-sectional view for showing the electrode for preventing noise electric wave according to the Fifth Preferred Embodiment of the present invention.

As shown in the cross-sectional view of FIG. 16, the rotor electrode 2 according to the Embodiment 26 is made of brass having the thickness of 1.6 mm. The rotor electrode 2 comprises an electrode substrate 20 which has two stepped portions 20*a* and 20*a* having each depth of about 1.2 mm and an edge surface 24, and a layer 2*a* for preventing noise electric wave comprising a thermal sprayed layer which is coated on the edge surface 24 by thermal spraying. The layer 2*a* for preventing noise electric wave comprises 60 wt % of CuO and 40 wt % of $Al_{2\ 3}$, and it has the porosity of 5% and the thickness of 400 microns.

Figure 17:
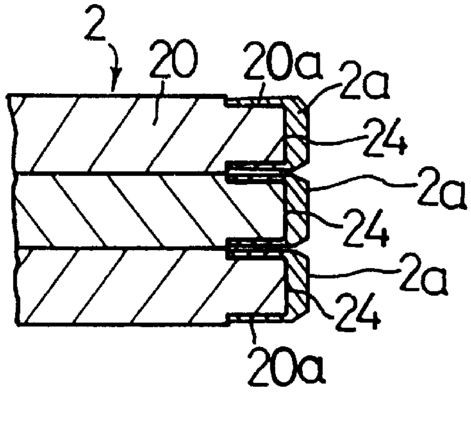
FIG. 17 is a cross-sectional view for explaining the method for producing the electrode according to the Embodiment 26.

The rotor electrode 2 is manufactured as follows. As shown in FIG. 17, a number of the above electrode substrates 20 are laminated in such a manner that the edge surface 24 is uniform surface, and the laminated electrode substrates 20 are set in a tool (not shown). The tool covers the right and left side surfaces of each laminated electrode substrate 20, the upper surface of the electrode substrate 20 at the top and the lower surface of the electrode substrate 20 at the bottom. Then, $Al_2O_3$-60 wt % CuO material is thermal sprayed by plasma method in the direction which is perpendicular to the edge surface 24 of each electrode 20. The thermal spraying by plasma method is performed under the condition that the porosity is set to be 5%, the voltage is 500V, the current is 75 A, the thermal spraying distance is 100 mm and the amount of powder supply is 40 g/minute. At this time, the thermal sprayed layer formed on the stepped portion 20*a* of each electrode substrate 20 is not brought into contact with each other. Then, the tool is removed and each electrode substrate is disassembled. And, a grinding machining is performed in such a manner that a grinder is brought into contact with the stepped portion 20*a* of each electrode substrate 20. Thus, the thermal sprayed layer formed on the stepped portion 20*a* is removed and the rotor electrode 2 according to the Embodiment 26 is completed.

According to the Embodiment 26, the layer 2*a* for preventing noise electric wave comprising the thermal sprayed layer having the porosity of not more than 20% is firmly formed only on the edge surface 24 of the electrode substrate 20. Therefore, it is possible to provide the electrode for preventing noise electric wave which can firmly prevent the generation of micro discharge at the porous portion of the thermal sprayed layer.

(Relationship between the porosity of the layer for preventing noise electric wave and the effect for decreasing radio noise)

In the method according to the Embodiment 26, the thermal spraying distance at the time of thermal spraying by plasma method is changed, and the porosity of the layer 2*a* for preventing noise electric wave is variously changed in the range of 5 to 50%, thereby manufacturing each rotor electrode. Concerning these rotor electrodes and the above completed rotor electrode 2, PNL operating time and radiation electric field intensity were measured. The PNL operating time was measured by the turbulent time which is caused by that the positive magnetic wave is introduced from the radio antenna. At the same time, the radiation electric field intensity was measured by vehicles. The result is shown in FIG. 18.

Figure 18:
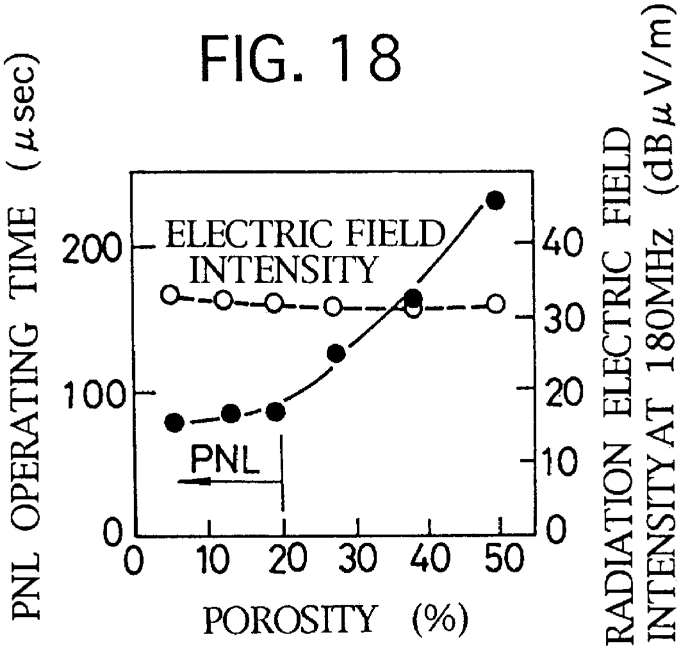
FIG. 18 is a graph for showing the relationship among the porosity of the thermal sprayed layer, PNL operating time and the radiation electric field intensity according to the Embodiment 26.

As shown in FIG. 18, the PNL operating time becomes short as the porosity of the layer 2*a* for preventing noise electric wave is decreased. When the porosity is decreased to be 20%, the decreasing rate becomes almost constant. The radiation electric field intensity maintains a certain value without receiving the influence of the porosity of the layer 2*a* for preventing noise electric wave. As a result, when the porosity of the layer 2*a* for preventing noise electric wave is set to be not more than 20%, the PNL operating time is drastically decreased. Therefore, it is possible to decrease the radio noise without decreasing the effect for preventing noise electric wave.

(Relationship between the thickness of the porous thermal sprayed layer and the effect for decreasing radio noise)

Figure 19:
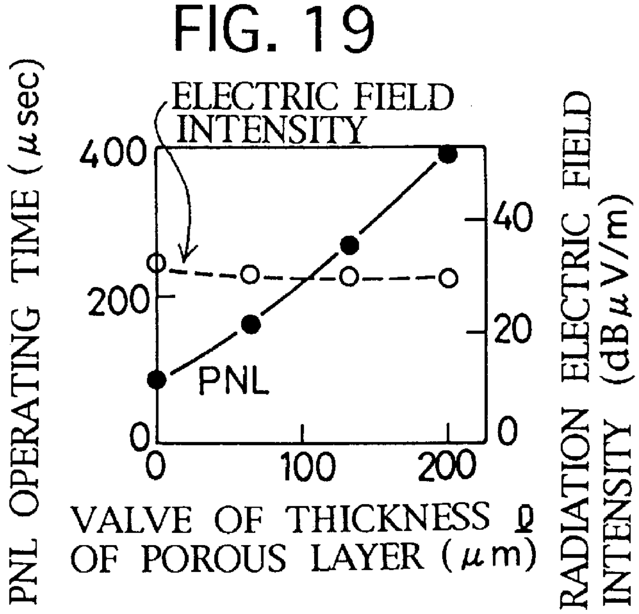
FIG. 19 is a graph for showing the relationship among the thickness of the porous thermal sprayed layer, PNL operating time and the radiation electric field intensity according to the Embodiment 26.
Figure 20:
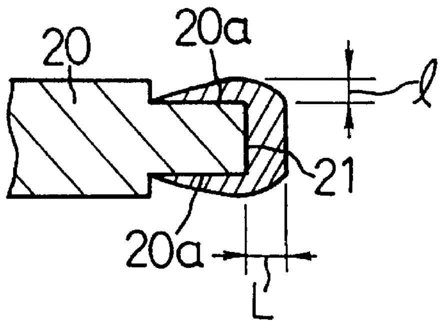
FIG. 20 is a main cross-sectional view for showing the electrode for preventing noise electric wave which is manufactured by the conventional method.

In the method according to Embodiment 26, the amount of grinding of the grinding machining is controlled, and the thickness 1 of the thermal sprayed layer formed on the stepped portion 20*a* of the electrode substrate 20 is variously changed in the range of 0 to 200 microns, thereby manufacturing each rotor electrode. Concerning these rotor electrodes and the above completed rotor electrode 2, PNL operating time and radiation electric field intensity were measured. The result is shown in FIG. 19. As shown in FIG. 20, the thickness 1 of the thermal sprayed layer formed on the stepped portion 20*a* of the electrode substrate 20 is the maximum thickness, and the porosity of the thermal sprayed layer is about 50%. The thermal sprayed layer formed on the edge surface 24 of the electrode substrate has the thickness L of 400 microns, and the porosity of about 5%.

As shown in FIG. 19, the PNL operating time becomes short as the thickness of the porous thermal sprayed layer is decreased. When the porous thermal sprayed layer is completely removed, the PNL operating time becomes the shortest. The radiation electric field intensity maintains a certain value without receiving the influence of thickness of the porous thermal sprayed layer. As a result, when the thickness of the porous thermal sprayed layer becomes thin, the PNL operating time is decreased. Therefore, it is possible to decrease the radio noise without decreasing the effect for preventing noise electric wave.

Embodiment 27

In the Embodiment 27, a rotor electrode 2 as the electrode for preventing noise electric wave is manufactured by the second method according to claim 8. The materials for the electrode substrate 20 and the layer 2*a* for preventing noise electric wave are the same as those of the Embodiment 26, and the layer 2*a* for preventing noise electric wave has the porosity of 5% and the thickness of 400 microns.

Figure 21:
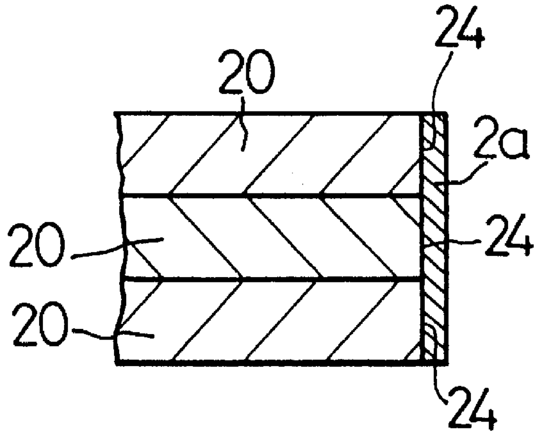
FIG. 21 is a cross-sectional view for explaining the method for producing the electrode according to the Embodiment 27.

As shown in FIG. 21, a number of the electrode substrates 20 having the same thickness (1.6 mm) each other are laminated in such a manner that the edge surface 24 is uniform surface, and the laminated electrode substrates 20 are set in a tool (not shown). Then, $Al_2O_3$-60 wt % CuO material is thermal sprayed by plasma method in the direction which is perpendicular to the edge surface 24 of each electrode 20. The thermal spraying by plasma method is performed under the same condition as that of the Embodiment 26. After the tool is removed, the layer 2*a* for preventing noise electric wave is separated along a dividing line of each electrode substrate 20. Thus, the rotor electrode 2 according to the Embodiment 27 is completed.

In the method according to Embodiment 27, the thermal spraying is performed to each edge surface 24 of many laminated electrode substrates 20. Therefore, it is possible to prevent the formation of the porous thermal sprayed layer at least on the overlapping surface of the neighboring electrode substrates 20. Furthermore, it is possible to manufacture many electrodes productively.

In order to prevent the coming-off of the layer at the time of separating the layer 2*a* for preventing noise electric wave, it is preferable that the thickness of the layer 2*a* is not more than 500 microns.

Embodiment 28

Figure 22:
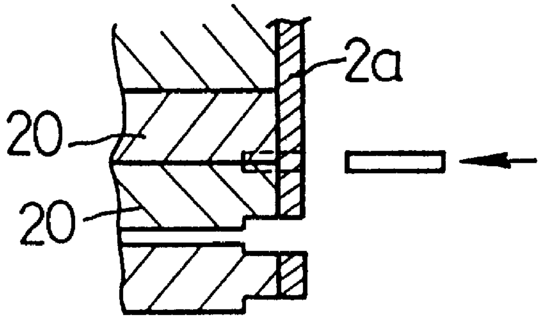
FIG. 22 is a cross-sectional view for showing the variations of the method for producing the electrode according to the Embodiment 28.

In the Embodiment 28, a rotor electrode 2 is manufactured by the same method and same manners as those of the Embodiment 27 except the following. As shown in FIG. 22, after thermal spraying, the layer 2*a* for preventing noise electric wave and the electrode substrate 20 are made a notch along the overlapped portion of the electrode substrate 20 by grinder for cutter (the thickness of 0.5 mm). The depth of the notch is twice as much as the thickness of the layer 2*a* for preventing noise electric wave. Therefore, it is possible to easily and firmly separate the layer 2*a* for preventing noise electric wave.

Embodiment 29

In the Embodiment 29, a rotor electrode 2 as the electrode for preventing noise electric wave is manufactured by the third method according to claim 9. The materials for the electrode substrate 20 and the layer 2*a* for preventing noise electric wave are the same as those of the Embodiment 26, and the layer 2*a* for preventing noise electric wave has the porosity of 5% and the thickness of 400 microns.

Figure 23:
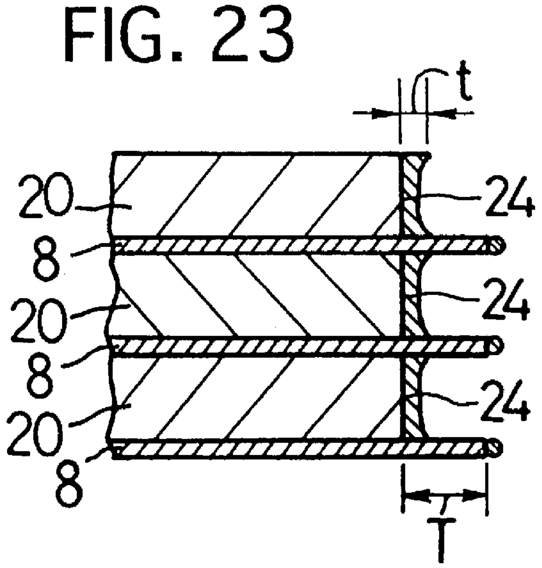
FIG. 23 is a cross-sectional view for explaining the method for producing the electrode according to the Embodiment 29.

A planar spacer 8 made of steel material having the thickness of 0.1 mm is prepared. As shown in FIG. 23, a number of the electrode substrates 20 having the same thickness (1.6 mm) each other and a number of spacers 8 are laminated in such a manner that the edge surface 24 is uniform surface and that the tip of each spacer 8 is projected from the edge surface 24 of the electrode substrate 20 by 1.0 mm, and the laminated electrode substrates 20 are set in a tool (not shown). The spacer 8 is disposed at the top and bottom edges in the laminated direction. Then, $Al_2O_3$-60 wt % CuO material is thermal sprayed by plasma method in the direction which is perpendicular to the edge surface 24 of each electrode 20. The thermal spraying by plasma method is performed under the same condition as that of the Embodiment 26. After the tool is removed, the layer 2*a* for preventing noise electric wave is tore off from each spacer 8. Thus, the rotor electrode 2 according to the Embodiment 29 is completed.

In the method according to Embodiment 29, the layer 2*a* for preventing noise electric wave formed at the edge surface 24 of each electrode substrate 20 is previously separated by each spacer 8. Therefore, it is possible to control the coming-off of the layer at the time of separating the layer 2*a* for preventing noise electric wave.

The thickness of the spacer 8 is not especially restricted. However, it is necessary that the length T of the spacer 8 projected from the edge surface 24 is longer than at least the thickness t of the layer 2*a* for preventing noise electric wave. It is preferable that the material of the spacer 8 is excellent in coming-off from the thermal sprayed material.

Embodiment 30

In the Embodiment 30, a rotor electrode 2 as the electrode for preventing noise electric wave is manufactured by the fourth method according to claim 10. The materials for the electrode substrate 20 and the layer 2*a* for preventing noise electric wave are the same as those of the Embodiment 26, and the layer 2*a* for preventing noise electric wave has the porosity of 5% and the thickness of 400 microns.

Figure 24:
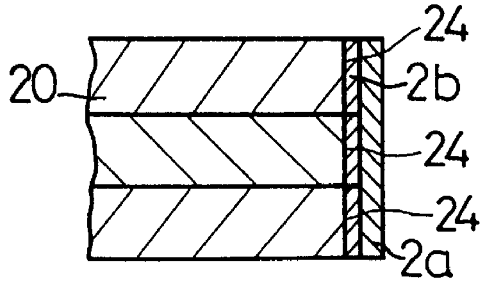
FIG. 24 is a cross-sectional view for explaining the method for producing the electrode according to the Embodiment 30.

As shown in FIG. 24, a number of the electrode substrates 20 having the same thickness (1.6 mm) each other are laminated in such a manner that the edge surface 24 is uniform surface, and the laminated electrode substrates 20 are set in a tool (not shown). Then, Ni-5% Al alloy as the thermal spraying material is thermal sprayed in the direction which is perpendicular to the edge surface 24 of each electrode 20 to form a substrate thermal sprayed layer 2*b* having the thickness of 100 microns. After the tool is removed, the substrate thermal sprayed layer 2*b* is separated along a dividing line of each electrode substrate 20. Each electrode substrate 20 on which the substrate thermal sprayed layer 2*b* is formed is re-laminated, and the re-laminated electrode substrates 20 are set in the tool. Then, $Al_2O_3$-60 wt % CuO material is thermal sprayed by plasma method in the direction which is perpendicular to the edge surface 24 of each electrode 20. The thermal spraying by plasma method is performed under the same condition as that of the Embodiment 26. After the tool is removed, the layer 2*a* for preventing noise electric wave is separated along a dividing line of each electrode substrate 20. Thus, the rotor electrode 2 according to the Embodiment 30 is completed.

In the method according to Embodiment 30, when the layer 2*a* for preventing noise electric wave is separated along each electrode substrate 20, a breaking portion of the substrate thermal sprayed layer 2*b* is stress concentration point. Since the breaking portion is determined as the starting point, it is possible to easily and firmly separate the layer 2*a* for preventing noise electric wave. Furthermore, the adhesion of the layer 2*a* for preventing noise electric wave to the electrode substrate 20 is improved by the substrate thermal sprayed layer 2b. Therefore, it is possible to control the coming-off of the layer at the time of separating the layer 2*a* for preventing noise electric wave.

Embodiment 31

In the Embodiment 31, a rotor electrode 2 as the electrode for preventing noise electric wave is manufactured by the fifth method according to claim 11. The materials for the electrode substrate 20 and the layer 2*a* for preventing noise electric wave are the same as those of the Embodiment 26, and the layer 2*a* for preventing noise electric wave has the porosity of 5% and the thickness of 400 microns.

Figure 25:
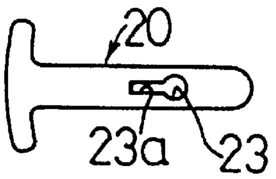
FIG. 25 is a plane view for showing the electrode substrate according to the Embodiment 31.
Figure 26:
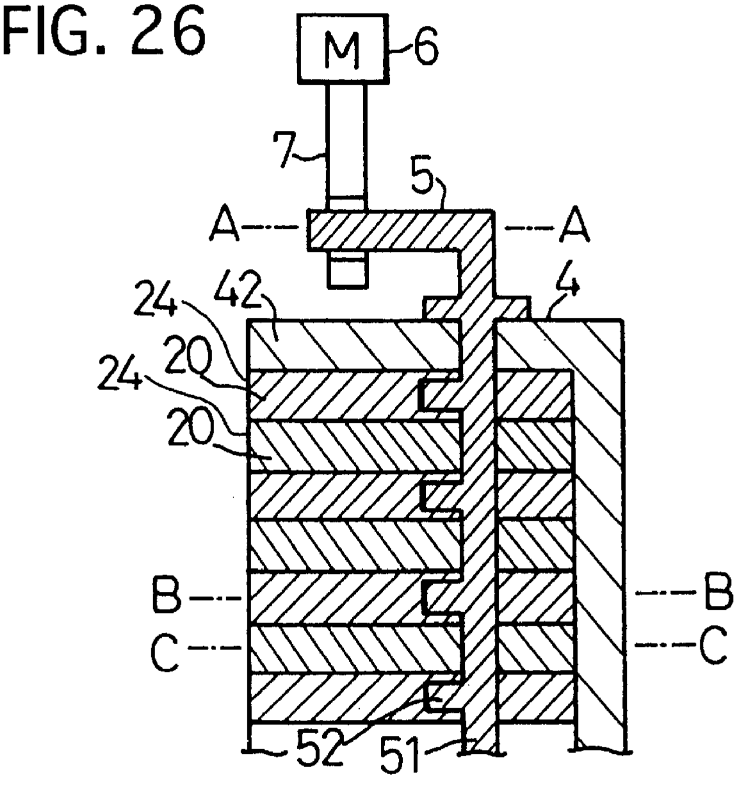
FIG. 26 is a cross-sectional view for explaining the method for producing the electrode according to the Embodiment 32.

As shown in the plan view of FIG. 25, an electrode substrate 20 having a key hole 23 with a key engaging portion 23*a* is prepared. As shown in FIG. 26, a number of the electrode substrates 20 having the same thickness (1.6 mm) each other are laminated, and set in a swing apparatus which mainly comprises a fixed tool 4, a swing tool 5, a motor 6 and a cam shaft 7 as follows.

Figure 27:
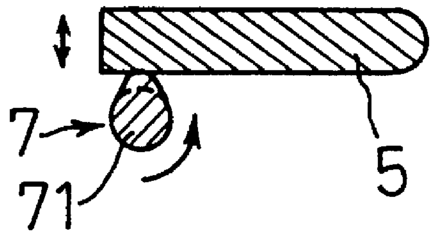
FIG. 27 is a cross-sectional view along line A—A of FIG. 26 according to the Embodiment 32.
Figure 28:
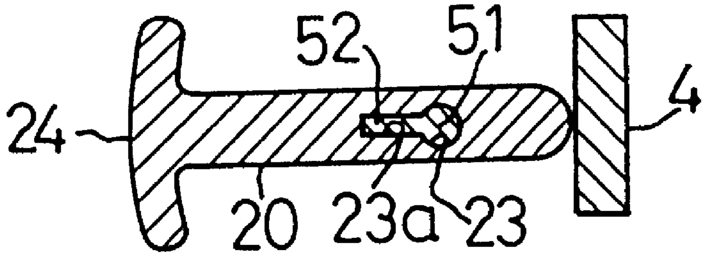
FIG. 28 is a cross-sectional view along line B—B of FIG. 26 according to the Embodiment 32.
Figure 29:
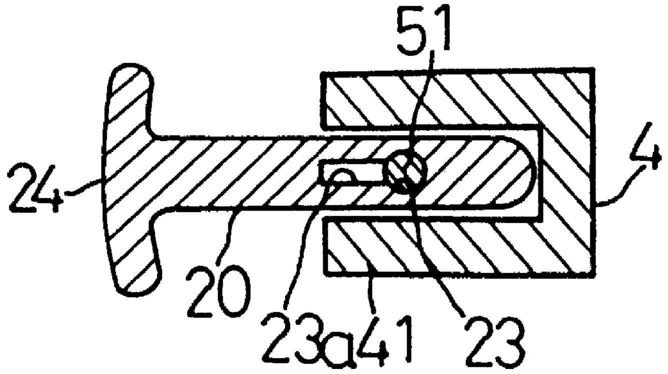
FIG. 29 is a cross-sectional view along line C—C of FIG. 26 according to the Embodiment 32.

As shown in FIG. 27, the swing tool 5 is brought into contact with a cam portion 71 of the cam shaft 7 which is connected with the motor 6, and it is swingable in the right and left directions (namely, in the direction vertical to the paper in FIG. 26; or in the up and down directions in FIG. 27) by the rotation of the cam shaft 7. As shown in FIG. 28, the swing tool 5 has a bar portion 51 and a number of key portions 52. The bar portion 51 is inserted through the key hole 23 of each laminated electrode substrate 20, and the key portion 52 is engaged with the key engaging portion 23*a* of the key hole 23 of every other laminated electrode substrate 20. As shown in FIG. 29, concerning each electrode substrate 20 in which the key portion 52 is not engaged with the key engaging portion 23*a* of the key hole 23, the right and left side surfaces is restricted their movement in the right and left directions by a regulated wall surface 41 of the fixed tool 4. Furthermore, concerning the laminated electrode substrates 20, the upper surface of the electrode substrate 20 at the top and the lower surface of the electrode substrate 20 at the bottom are respectively covered by an upper wall surface 42 and a lower wall surface of the fixed tool 4.

The cam shaft 7 is rotated by driving the motor 6, and the swing tool 5 is swung. Then, $Al_2O_3$-60 wt % CuO material is thermal sprayed by plasma method in the direction which is perpendicular to the edge surface 24 of each electrode 20 while swinging only the electrode substrate 20 in which the key portion 52 is engaged with the key engaging portion 23*a* of the key hole 23.

The thermal spraying by plasma method is performed under the same condition as that of the Embodiment 26. The swing is performed under the condition that the swing frequency is 5 Hz, and the swing amplitude is 700 microns. The formation speed of the thermal sprayed layer is 100 microns per second, the thickness of the thermal sprayed layer which is formed during 1 cycle of swing is 20 microns. The average particle diameter of the thermal spraying material powder is 22 microns. After the thermal spraying material is thermal sprayed, it becomes flat and the average particle diameter is 70 microns. Therefore, the value of s (the swing amplitude) to d (the particle diameter after thermal spraying) is 10.

After that, the swing apparatus is removed from each electrode substrate 20, and the rotor electrode 2 according to the Embodiment 31 is completed.

(Relationship between the swing speed and the fraction defective of the thermal sprayed layer)

The relationship between the swing speed and the fraction defective of the thermal sprayed layer is examined under the above condition. The fraction defective is defined as the coming-off of the thermal sprayed layer or the crack in the layer due to swing. In order to examine the swing speed, it is necessary to consider the relationship with the formation speed of the thermal sprayed layer. Thus, the thickness of the thermal sprayed layer which is formed during 1 cycle of swing is used to judge whether the condition of the swing speed is good or not. The result is shown in FIG. 30.

Figure 30:
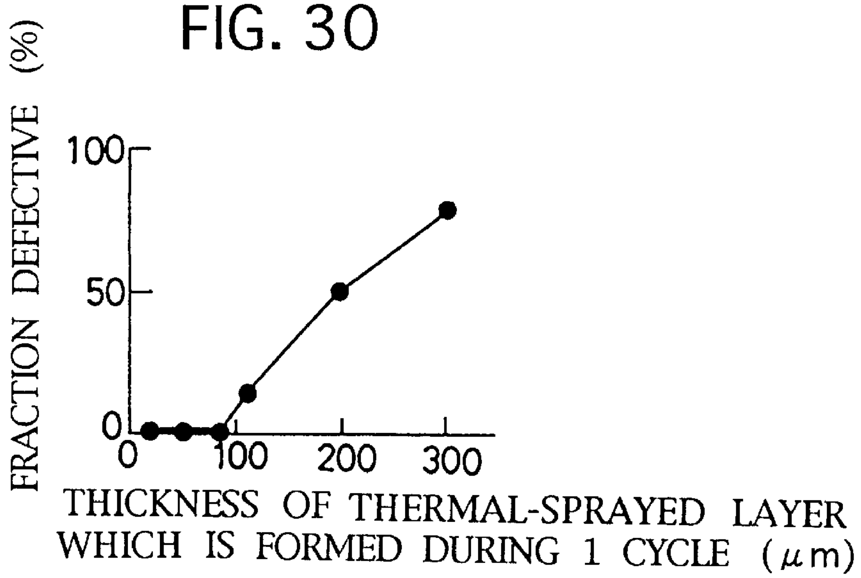
FIG. 30 is a graph for showing the relationship between the fraction defective of the thermal sprayed layer and the thickness of the thermal sprayed layer which is formed during 1 cycle of swing according to the Embodiment 32.

As shown in FIG. 30, when the thickness of the thermal sprayed layer which is formed during 1 cycle of swing is not more than 100 microns, it is possible to satisfactorily form the thermal sprayed layer with no fraction defective.

(Relationship between the swing amplitude and the fraction defective of the thermal sprayed layer)

The relationship between the swing amplitude and the fraction defective of the thermal sprayed layer is examined under the above condition. In order to examine the swing amplitude, it is necessary to consider the relationship with the particle diameter of the thermal spraying material powder after thermal spraying. Thus, the value of s (the swing amplitude) to d (the particle diameter of the thermal spraying material after thermal spraying) is used to judge whether the condition of the swing amplitude is good or not. The result is shown in FIG. 31.

Figure 31:
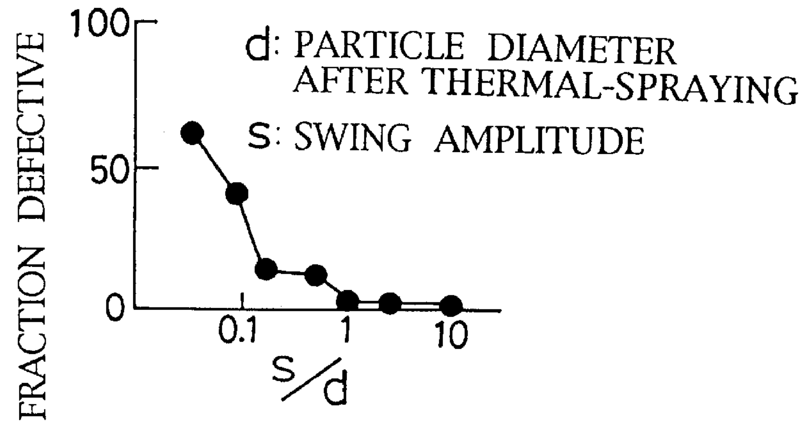
FIG. 31 is a graph for showing the relationship between the fraction defective of the thermal sprayed layer and the value of s (swing amplitude)/d (particle diameter after thermal spraying) according to the Embodiment 32.

As shown in FIG. 31, when the value of s (the swing amplitude) to d (the particle diameter of the thermal spraying material after thermal spraying) is not less than 1, it is possible to satisfactorily form the thermal sprayed layer with no fraction defective.

Embodiment 32

In the Embodiment 32, a rotor electrode 2 as the electrode for preventing noise electric wave is manufactured by the sixth method according to claim 12. The materials for the electrode substrate 20 and the layer 2*a* for preventing noise electric wave are the same as those of the Embodiment 26, and the layer 2*a* for preventing noise electric wave has the porosity of 5% and the thickness of 400 microns.

A long-shaped electrode raw material having the same cross-sectional shape as that of the electrode substrate 20 is prepared. Then, $Al_2O_3$-60 wt % CuO material is thermal sprayed by plasma method to one surface of the electrode raw material in the perpendicular direction. The thermal spraying by plasma method is performed under the same condition as that of the Embodiment 26. After that, the thermal sprayed electrode raw material is cut in the direction perpendicular to the thermal sprayed surface by grinder for cutter to be the electrode substrate 20 having a certain thickness. Thus, the rotor electrode 2 according to the Embodiment 32 is completed.

In the method according to Embodiment 32, it is possible to prevent the formation of the porous thermal sprayed layer at least on the cut surface of the separated electrode substrate 20. Furthermore, it is possible to manufacture many electrodes productively. Moreover, the layer 2*a* for preventing noise electric wave is separated by machining at the time of cutting. Therefore, it is possible to control the coming-off of the layer 2*a* or slippage at the cut surface.

Embodiment 33

In the Embodiment 33, a rotor electrode 2 as the electrode for preventing noise electric wave is manufactured by the seventh method according to claim 13. The materials for the electrode substrate 20 and the layer 2*a* for preventing noise electric wave are the same as those of the Embodiment 26, and the layer 2*a* for preventing noise electric wave has the porosity of 5% and the thickness of 400 microns.

A number of the electrode substrates 20 which has the same shape as that of the Embodiment 26 are laminated in such a manner that the edge surface 24 is uniform surface, and the laminated electrode substrates 20 are set in a tool (not shown). The tool maintains the base edge side of each laminated electrode substrate 20. The right and left side surfaces of each laminated electrode substrate 20, the upper surface of the electrode substrate 20 at the top and the lower surface of the electrode substrate 20 at the bottom are exposed at the tip side of each electrode substrate 20, namely, at the edge surface 24 on which thermal spraying is performed. Then, $Al_2O_3$-60 wt % CuO material is thermal sprayed by plasma method in the direction which is perpendicular to the edge surface 24 of each electrode 20. The thermal spraying by plasma method is performed under the same condition as that of the Embodiment 26. After that, the tool is removed and each electrode substrate is disassembled. The thermal sprayed layer formed on the surface of each electrode substrate 20 which is horizontal to the thermal spraying direction (the upper and lower surfaces and the right and left side surfaces of the stepped portion 20*a*) is fused and densified by laser irradiation. Thus, the rotor electrode 2 according to the Embodiment 33 is completed. The laser irradiation is performed under the condition that the laser output is 100 W, the laser pulse is 10 msec/pulse and 20 pulse/second, and the irradiation traverse speed is 1 cm/second. The porosity of the thermal sprayed layer before laser irradiation is about 50%, and the porosity of the thermal sprayed layer after laser irradiation is about 10%.

In the method according to Embodiment 33, the porous thermal sprayed layer formed on the surface of the electrode substrate 20 which is horizontal to the thermal spraying direction is densified by laser irradiation, and the porous portion of the thermal sprayed layer is firmly omitted. Therefore, it is possible to provide the electrode for preventing noise electric wave which can firmly prevent the generation of the micro discharge at the porous portion of the thermal sprayed layer.

(Relationship between the porosity of the thermal sprayed layer formed on the surface of the electrode substrate which is horizontal to the thermal spraying direction and the effect for decreasing radio noise)

In the method according to the Embodiment 33, the laser output and the time for irradiation are changed, and the porosity of the thermal sprayed layer formed on the surface of the electrode substrate which is horizontal to the thermal spraying direction is variously changed, thereby manufacturing each rotor electrode. Concerning these rotor electrodes and the above completed rotor electrode 2, PNL operating time and radiation electric field intensity were measured. The result is shown in FIG. 32.

Figure 32:
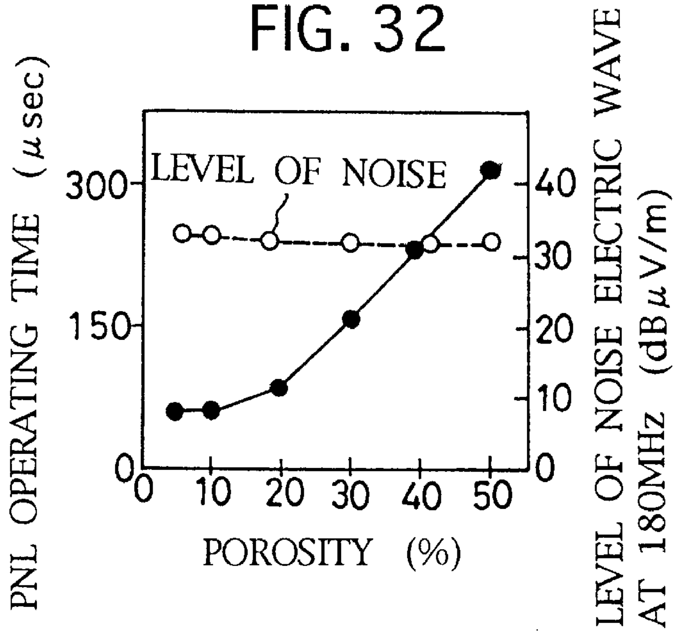
FIG. 32 is a graph for showing the relationship among the porosity of the thermal sprayed layer formed on the surface of the electrode substrate which is parallel to the thermal spraying direction, PNL operating time and the radiation electric field intensity according to the Embodiment 33.

As shown in FIG. 32, the PNL operating time becomes short as the porosity of the above thermal sprayed layer is decreased. When the porosity is not more than 20%, the decreasing rate becomes almost constant. The radiation electric field intensity maintains a certain value without receiving the influence of the porosity of the thermal sprayed layer. As a result, when the porosity of the thermal sprayed layer is set to be not more than 20%, the PNL operating time is drastically decreased. Therefore, it is possible to decrease the radio noise without decreasing the effect for preventing noise electric wave.

Figure 33:
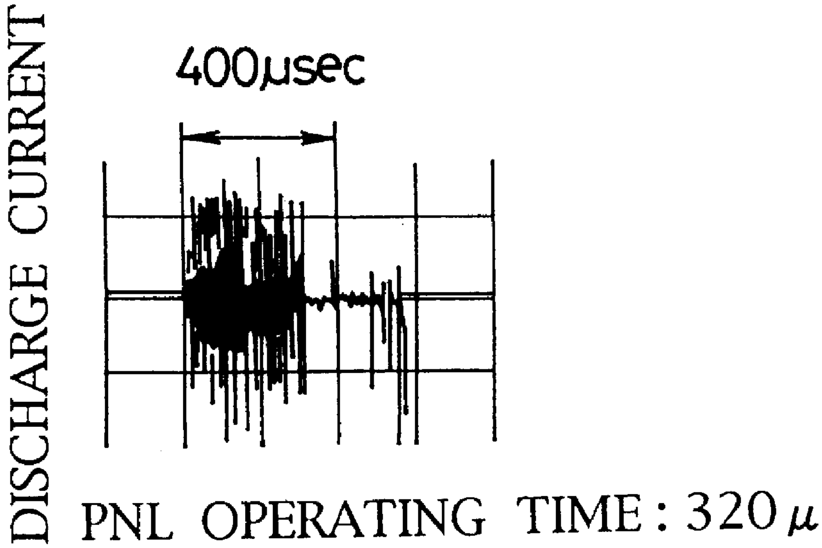
FIG. 33 is a graph for showing the result of examining PNL operating time and the induced discharge wave form before the porous thermal sprayed layer is fused by the high density energy.
Figure 34:
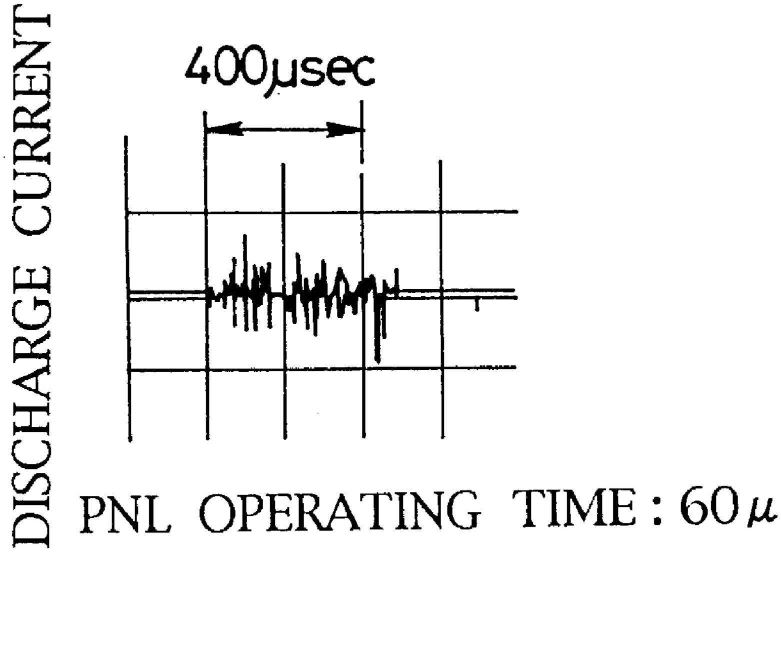
FIG. 34 is a graph for showing the result of examining PNL operating time and the induced discharge wave form after the porous thermal sprayed layer is fused by the high density energy to be densified.

FIG. 33 shows the result of examining PNL operating time and the induced discharge wave form before the porous thermal sprayed layer is fused. FIG. 34 shows the result of examining PNL operating time and the induced discharge wave form after the porous thermal sprayed layer is fused. As shown in FIGS. 33 and 34, it is possible to drastically decrease the PNL operating time and the radio noise.

In the Embodiment 33, not only the laser irradiation but also the electron beam is used as the means for fusing the thermal sprayed layer which is formed on the surface of the electrode substrate which is horizontal to the thermal spraying direction.

Sixth Preferred Embodiment

Embodiment 34

In the Embodiment 34, an electrode for preventing noise electric wave according to claim 14 is use as a rotor electrode 2.

Figure 35:
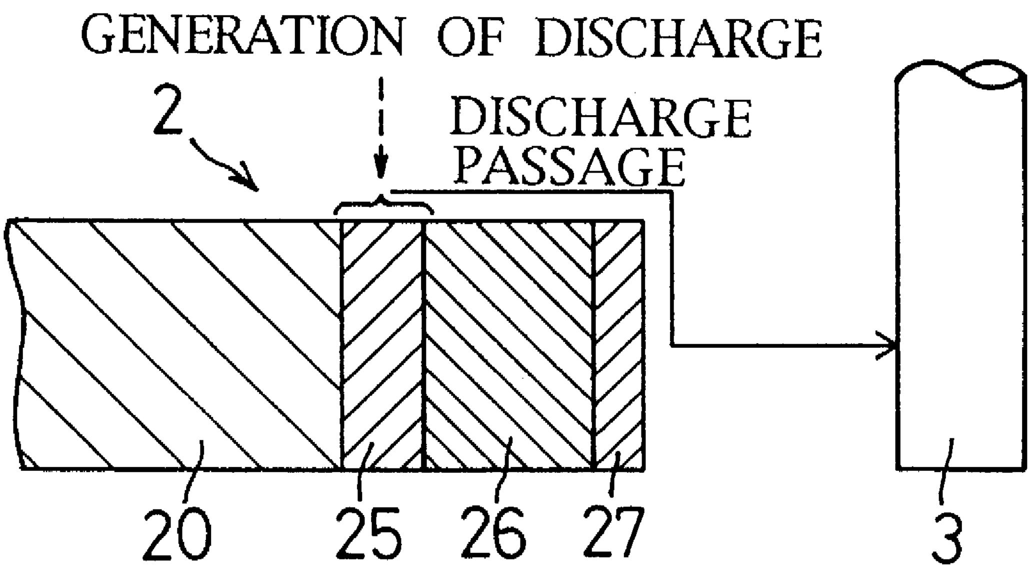
FIG. 35 is a whole cross-sectional view for showing the electrode for preventing noise electric wave according to the Sixth Preferred embodiment of the present invention.

As shown in the cross-sectional view of FIG. 35, the rotor electrode 2 according to the Embodiment 34 comprises an electrode substrate 20 made of brass having the thickness of 1.6 mm, a high-fusing conductive material layer 25 which is coated by thermal spraying on the surface of the electrode substrate 20 faced to a side electrode 3, a first resisting material layer 26 which is coated by thermal spraying on the surface of the high-fusing conductive material layer 25, and a second resisting material layer 27 which is coated by thermal spraying on the surface of the first resisting material layer 26.

The high-fusing conductive material layer 25 is made of Mo having the resistivity of $5.7\times10^{-6}$ ohm centimeters and the fusing point of 2622° C. The thickness of the high-fusing conductive material layer 25 is 100 microns.

The first resisting material layer 26 is made of $Al_2O_3$-13% $TiO_2$. The thickness of the first resisting material layer 26 is 400 microns.

The second resisting material layer 27 is made of $Al_2O_3$. The thickness of the second resisting material layer is 50 microns.

The high-fusing conductive material layer 25, the first resisting material layer 26 and the second resisting material layer 27 are formed by Plasma thermal spraying method. After thermal spraying, the upper and lower surfaces of the electrode substrate 20 are ground, and the porous thermal sprayed layer formed on the upper and lower surfaces of the electrode substrate 20 is removed.

Embodiment 9

In order to confirm the effect of the formation of the high-fusing conductive material layer 25, a rotor electrode according to the Embodiment 9 is prepared. The rotor electrode comprises an electrode substrate which is made of brass; a first resisting material layer (first layer) which is made of $Al_2O_3$-13% $TiO_2$, and which is coated by thermal spraying on the surface of the electrode substrate, and which has the thickness of 400 microns; and a second resisting material layer (second layer) which is made of $Al_2O_3$, and which is coated by thermal spraying on the surface of the electrode substrate, and which has the thickness of 50 microns.

Embodiment 35

In order to confirm the effect of the formation of the high-fusing conductive material layer 25, a rotor electrode is prepared. The rotor electrode is the same as that of the Embodiment 9 except that the electrode substrate is made of Mo.

(Evaluation of durability)

Concerning each rotor electrode according to the Embodiment 34, 9 and 35, an endurance test is performed while each rotor electrode is used for 0 to 800 hours, and noise electric wave having 180 mHz was measured by an actual vehicle. The result is shown in FIG. 36.

Figure 36:
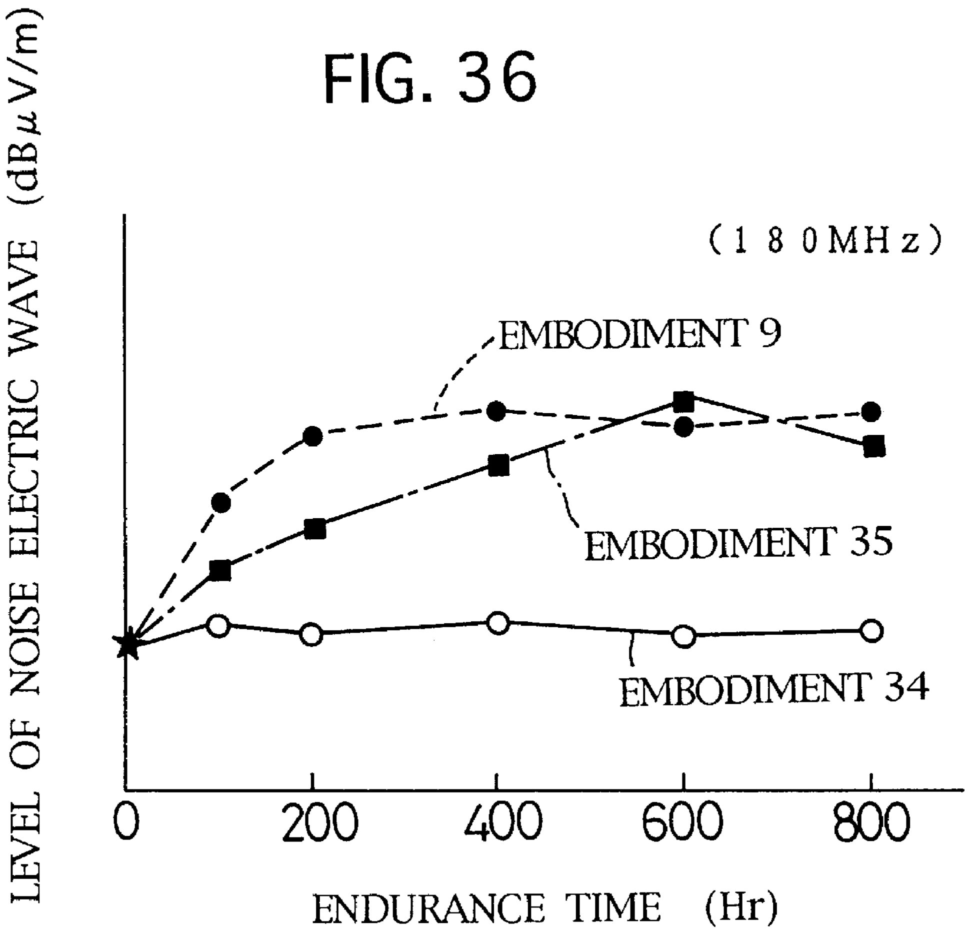
FIG. 36 is a graph for showing the relationship between the endurance time and the level of noise electric wave according to the Sixth Preferred embodiment of the present invention.

As shown in FIG. 36, concerning the rotor electrode according to the Embodiment 34 in which the high-fusing conductive material layer 25 is disposed between the first resisting material layer 26 and the electrode substrate 20, it is possible to maintain the initial performance for preventing noise electric wave after the rotor electrode has been used for 800 hours. On the contrary, concerning each rotor electrode according to the Embodiments 9 and 35 with no high-fusing conductive material layer 25, the performance for preventing noise electric wave is deteriorated after each rotor electrode has been used for 800 hours. The rotor electrode of the Embodiment 35 in which the electrode substrate is made of Mo having higher fusing point than that of brass has lower decreasing speed in performance for preventing noise electric wave than that of the Embodiment 9 in which the electrode substrate is made of brass. However, both of these rotor electrodes show the same deteriorated performance at last.

(Relationship between the thickness of the high-fusing conductive material layer and the level of noise electric wave)

Figure 37:
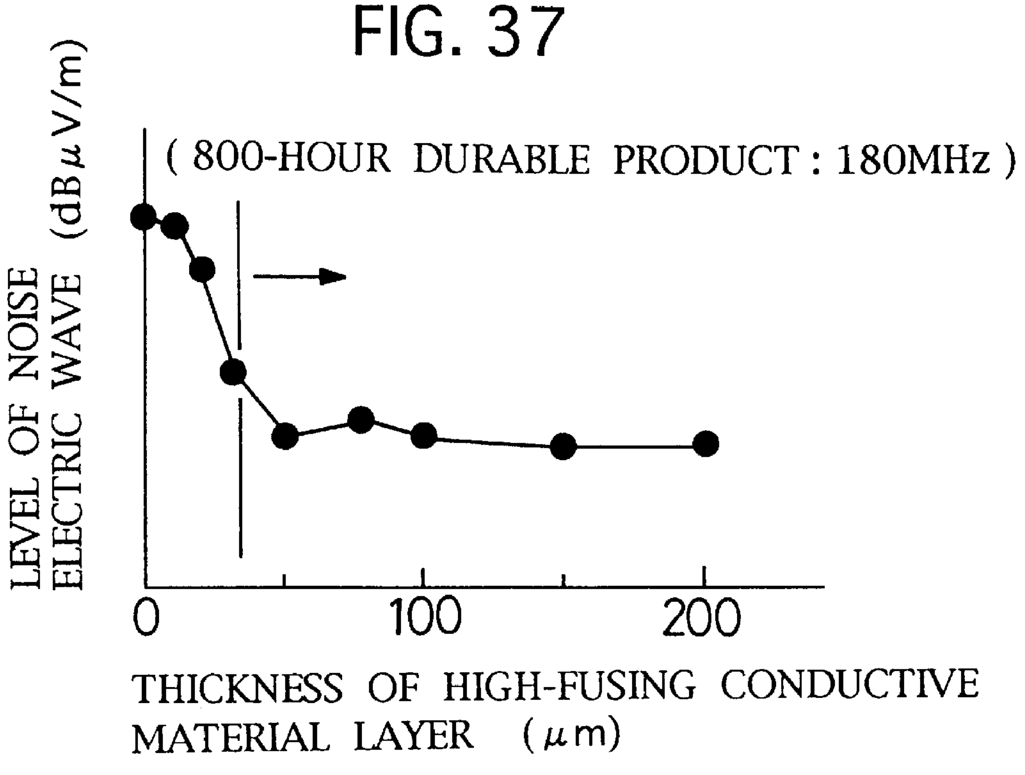
FIG. 37 is a graph for showing the relationship between the thickness of the high-fusing conductive material layer and the level of noise electric wave according to the Sixth Preferred Embodiment of the present invention.

Concerning the rotor electrode according to the Embodiment 34, the relationship between the thickness of the high-fusing conductive material layer 25 and the level of noise electric wave was examined. The result is shown in FIG. 37. The endurance test which is the same as above was performed, and noise electric wave having 180 mHz was measured.

As seen from FIG. 37, there is an appropriate thickness of the high-fusing conductive material layer 25 for improving the durability of the performance for preventing noise electric wave. When the thickness of the high-fusing conductive material layer 25 is less than 30 microns, the effect for improving the durability due to the high-fusing conductive material layer 25 cannot be satisfactorily achieved. Therefore, it is necessary that the thickness of the high-fusing conductive material layer 25 is not less than 30 microns, preferably, not less than 70 microns. When the high-fusing conductive material layer 25 becomes too thick, it is preferable that the thickness is not more than 200 microns since coming-off of the layer is generated.

Seventh Preferred Embodiment

Embodiment 36

In the Embodiment 36, an electrode for preventing noise electric wave according to claim 17 is use as a rotor electrode 2.

Figure 38:
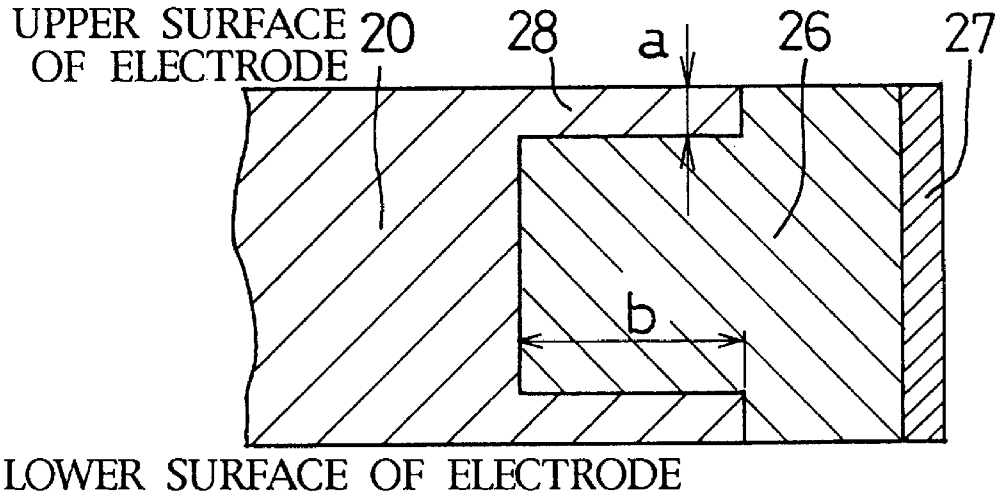
FIG. 38 is a whole cross-sectional view for showing the electrode for preventing noise electric wave according to the Seventh Preferred Embodiment of the present invention.

As shown in the cross-sectional view of FIG. 38, the rotor electrode 2 according to the Embodiment 36 comprises an electrode substrate 20 made of brass, a first resisting material layer 26 which is coated by thermal spraying on the surface of the electrode substrate 20 faced to a side electrode, and a second resisting material layer 27 which is coated by thermal spraying on the surface of the first resisting material layer 26.

The electrode substrate 20 has a covering portion 28 which is covered on the upper and lower surfaces of the first resisting material layer 26, and which is located at the connecting portion between the electrode substrate and the first resisting material layer 26. The thickness a of the covering portion is 0.2 mm, and the length b of the covering portion is 0.5 mm.

The first resisting material layer 26 is made of $Al_2O_3$-13% $TiO_2$. The thickness of the first resisting material layer 26 from the edge surface of the covering portion 28 is 400 microns.

The second resisting material layer 27 is made of $Al_2O_3$. The thickness of the second resisting material layer 27 is 50 microns.

The first resisting material layer 26 and the second resisting material layer 27 are formed by Plasma thermal spraying method on the electrode substrate 20 on which the covering portion 28 is previously formed. After thermal spraying, the upper and lower surfaces of the electrode substrate 20 are ground, and the porous thermal sprayed layer formed on the upper and lower surfaces of the electrode substrate 20 is removed. Therefore, the thickness of the electrode substrate 20 is 1.0 mm.

Embodiment 9

In order to confirm the effect of the formation of the covering portion 28, a rotor electrode according to the Embodiment 9 is prepared. The rotor electrode comprises an electrode substrate with no covering portion 28 which is made of brass; a first resisting material layer (first layer) which is made of $Al_2O_3$-13% $TiO_2$, and which is coated by thermal spraying on the surface of the electrode substrate, and which has the thickness of 400 microns; and a second resisting material layer (second layer) which is made of $Al_2O_3$, and which is coated by thermal spraying on the surface of the electrode substrate, and which has the thickness of 50 microns.

(Evaluation of durability)

Concerning each rotor electrode according to the Embodiments 9 and 36, an endurance test is performed while each rotor electrode is used for 0 to 800 hours, and noise electric wave having 180 mHz is measured by an actual vehicle. The result is shown in FIG. 39.

Figure 39:
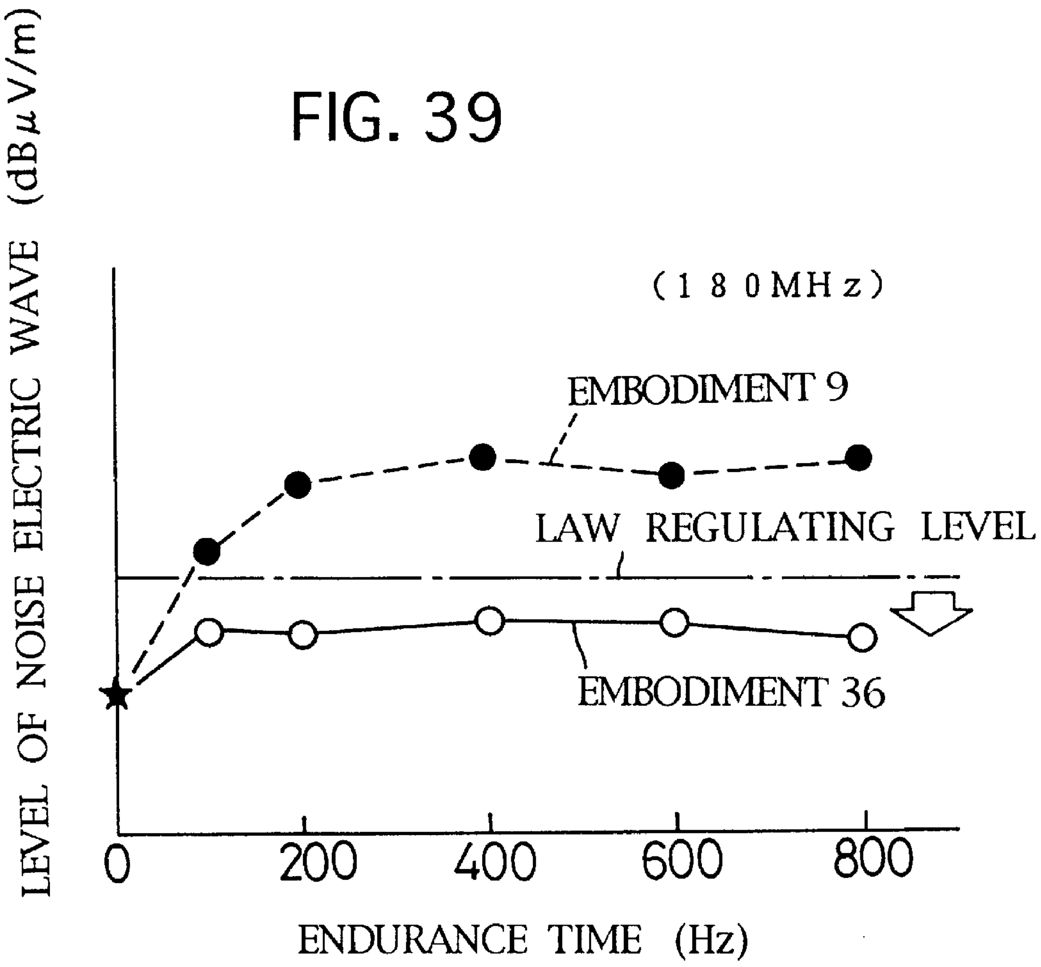
FIG. 39 is a graph for showing the relationship between the endurance time and the level of noise electric wave according to the Seventh Preferred Embodiment of the present invention.

As shown in FIG. 39, concerning the rotor electrode according to the Embodiment 36 in which the covering portion 28 is formed between the first resisting material layer 26 and the electrode substrate 20, the performance for preventing noise electric wave becomes deteriorated to some extent until 100 hours. After that, it is possible to maintain almost constant performance, and this is acceptable as compared with the law regulating level. On the contrary, concerning the rotor electrode according to the Embodiment 9 with no covering portion 28, the performance for preventing noise electric wave becomes deteriorated to show the higher level than the law regulating level until 100 hours, and is further deteriorated until 400 hours.

(Relationship between the thickness of the covering portion and the level of noise electric wave)

Figure 40:
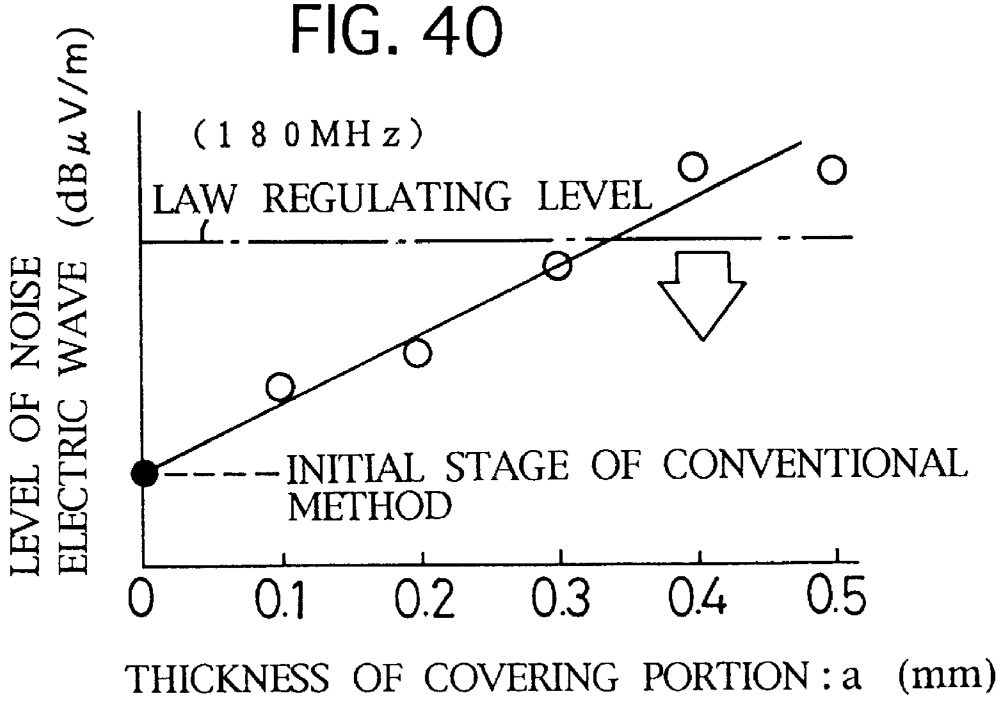
FIG. 40 is a graph for showing the thickness of the coating portion and the level of noise electric wave according to the Seventh Preferred Embodiment of the present invention.

Concerning the rotor electrode according to the Embodiment 36, the relationship between the thickness a of the covering portion 28 and the level of noise electric wave is examined. The result is shown in FIG. 40. The endurance test which is the same as above is performed, and noise electric wave having 180 mHz is measured after the rotor electrode has been used for 400 hours.

As seen from FIG. 40, there is an appropriate thickness a of the covering portion 28 for improving the durability of the performance for preventing noise electric wave. When the thickness a of the covering portion 28 is more than 0.34 mm, the performance for preventing noise electric wave shows the higher level that the law regulating level. Therefore, it is preferable that the thickness a of the covering portion 28 is not more than 0.34 mm, more preferably, not more than 0.25 mm. When the thickness a of the covering portion 28 becomes too thin, it is preferable that the thickness is not less than 0.1 mm since the speed for progressing fused loss becomes high.

It is necessary that the length b of the covering portion 28 is not less than 0.1 mm per 50000 km of the travel distance of an automobile. Therefore, it is preferable that the length b of the covering portion 28 is not less than 0.1 mm, more preferably, not less than 0.6 mm.

Eighth Preferred Embodiment

Embodiment 37

In the Embodiment 37, an electrode for preventing noise electric wave according to claim 5 is use as a rotor electrode 2.

The rotor electrode 2 according to the Embodiment 37 comprises a substrate 20 made of brass, a substrate layer 21 formed on the surface of the substrate 20, a first layer 22 formed and coated on the surface of the substrate layer 21 and a second layer 23 formed on the surface of the first layer 22.

The substrate layer 21 is formed in such a manner that the first layer 22 is firmly adhered to the substrate 20 by thermal spraying. The substrate layer 21 is made of Ni-5% Al alloy and has the thickness of 50 microns. The substrate layer 21 is formed by plasma spraying method.

The first layer 22 is made of $Al_2TiO_5$-70 wt % $Al_2O_3$ and has the thickness of 400 microns. The first layer 22 is formed by plasma spraying method. The direct current resistance value $R_1$ of the first layer 22 is in the range of $10^9$ ohm.

The second layer 23 is formed by performing heat-oxidation treatment due to plasma flame on the surface of the first layer 22. The second layer 23 has the thickness of about 10 microns. The direct current resistance value $R_2$ of the second layer 23 is in the range of $10^{10}$ ohm. $Al_2TiO_5$ is changed from insulating material to resisting material since oxygen defect is generated by plasma spraying. After that, $Al_2TiO_5$ is changed from resisting material to insulating material again because oxygen is supplied by oxidation treatment.

In the rotor electrode 2 according to the Embodiment 37, the first layer 22 is coated on the surface of the substrate 20, and the second layer 23 is formed on the surface of the first layer 22 by performing oxidation treatment on the surface of the first layer 22. After that, the upper and lower surfaces of the electrode are polished, and a porous thermal sprayed layer formed on the upper and lower surfaces is removed. Thus, the rotor electrode 2 is completed.

The following is the reason why the porous thermal sprayed layer formed on the upper and lower surfaces is removed. When the porous thermal sprayed layer exists around the place where discharge is generated (the upper and lower surfaces of the electrode), discharge electron is likely to remain in the space between thermal sprayed particles. The time for discharge becomes long so that noise is likely to occur in the radio which is loaded on automobiles.

Embodiment 38

In the Embodiment 38, a first layer 22 is coated and formed on the surface of a substrate layer 21 of a substrate 20 by plasma spraying method in the same manner as that of the Embodiment 37. Then, a second layer 23 is coated and formed on the surface of the first layer 22 by plasma spraying method. The second layer 23 is made of $Al_2O_3$ and has the thickness of about 10 microns. After that, the upper and lower surfaces of the electrode are polished, and a porous thermal sprayed layer is removed in the same manner as that of the Embodiment 37. Thus, a rotor electrode 2 according to the Embodiment 38 is completed.

Embodiment 39

In the Embodiment 39, a rotor electrode 2 is manufactured by the same method according to the Embodiment 38 except that the first layer 22 is made of $TiO_2$-70 wt % $Al_2O_3$ and has the thickness of 400 microns.

Embodiment 40

In the Embodiment 40, a rotor electrode 2 is manufactured by the same method according to the Embodiment 38 except that the first layer 22 is made of $TiO_2$-15 wt % $Al_2TiO_5$-70 wt % $Al_2O_3$ and has the thickness of 400 microns.

Comparative Example 1

A rotor electrode 2 according to Comparative Example 1 comprises only a substrate which is made of brass.

Comparative Example 6

In Comparative Example 6, a rotor electrode 2 is manufactured by the same method according to the Embodiment 37 except that only an insulation layer is formed on the surface of the substrate layer 21. The insulating layer is made of $Al_2O_3$ (99.7%) and has the thickness of 400 microns.

Comparative Example 8

In Comparative Example 8, a rotor electrode 2 is manufactured by the same method according to the Embodiment 37 except that the first layer 22 is made of CuO-40 wt % $Al_2O_3$ and has the thickness of 400 microns, and the second layer 23 is not formed.

Comparative Example 9

In Comparative Example 9, a rotor electrode 2 is manufactured by the same method according to the Embodiment 39 except that the second layer 23 is not formed.

Comparative Example 10

In Comparative Example 10, a rotor electrode 2 is manufactured by the same method according to the Embodiment 40 except that the second layer 23 is not formed.

(Evaluation)

Figure 41:
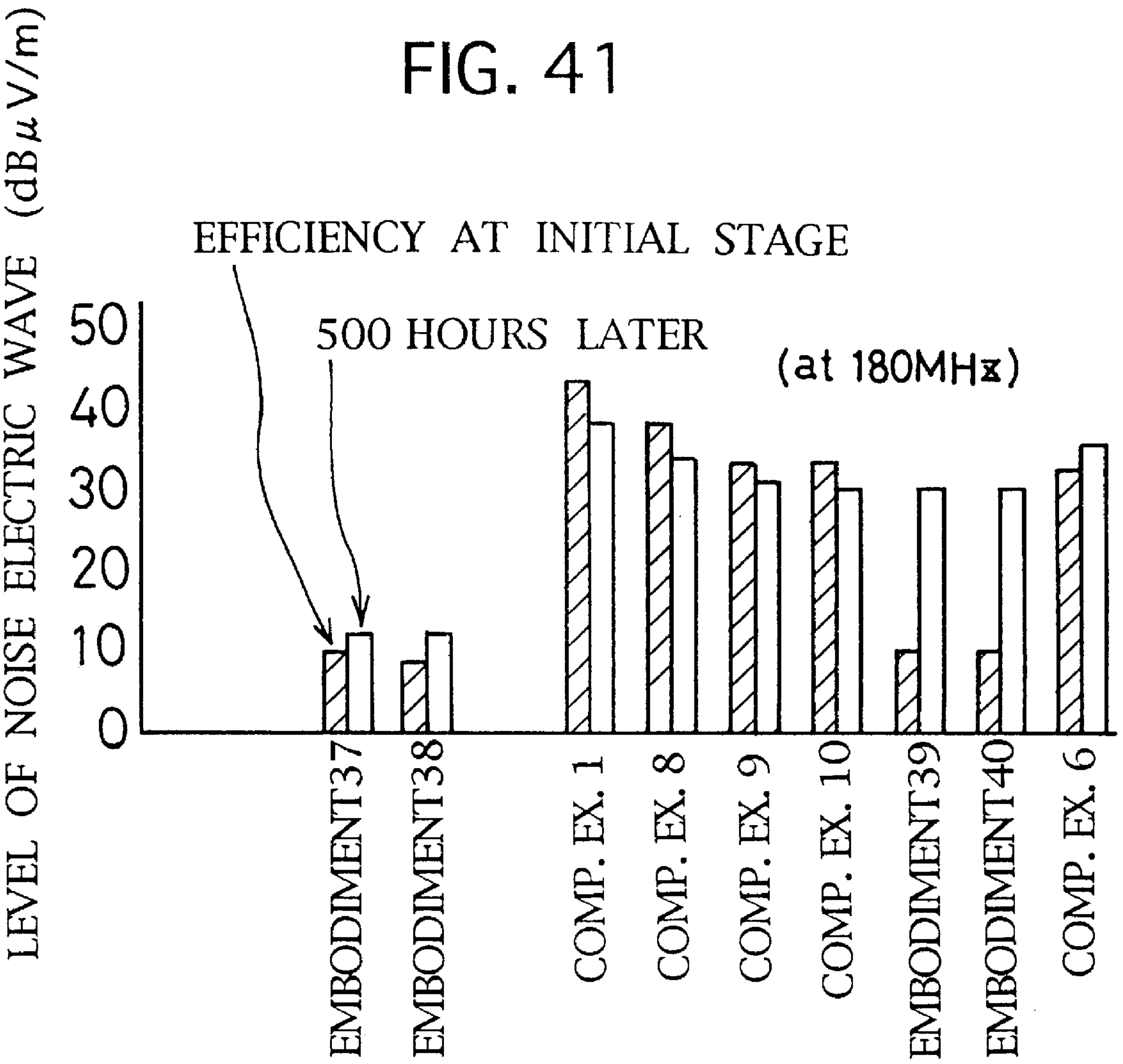
FIG. 41 is a bar graph for showing the level of noise electric wave of the electrode according to the Eighth Preferred Embodiment of the present invention.

Concerning each electrode, the decreasing amount of the level of noise electric wave (decreasing amount of noise) having 180 MHz was measured at the initial stage and at 500 hours later. The result is shown in FIG. 41. This measurement was performed under the condition that the temperature was ordinary temperature, and that the engine speed was 1500 rpm.

Figure 42:
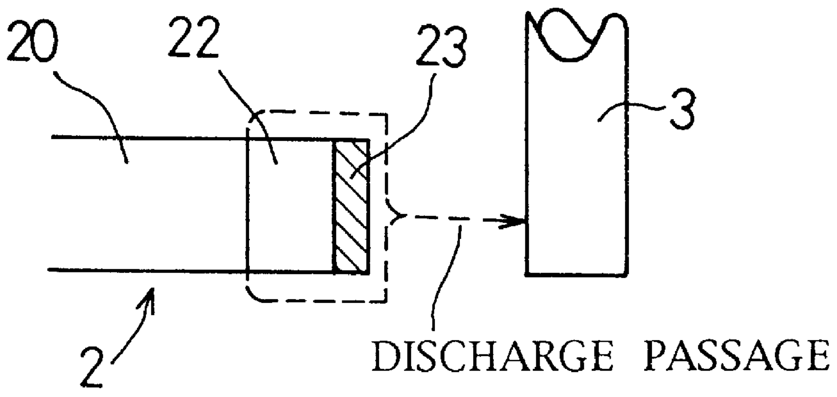
FIG. 42 is a cross-sectional view for typically showing discharge generation situation according to the Eighth Preferred Embodiment of the present invention.
Figure 43:
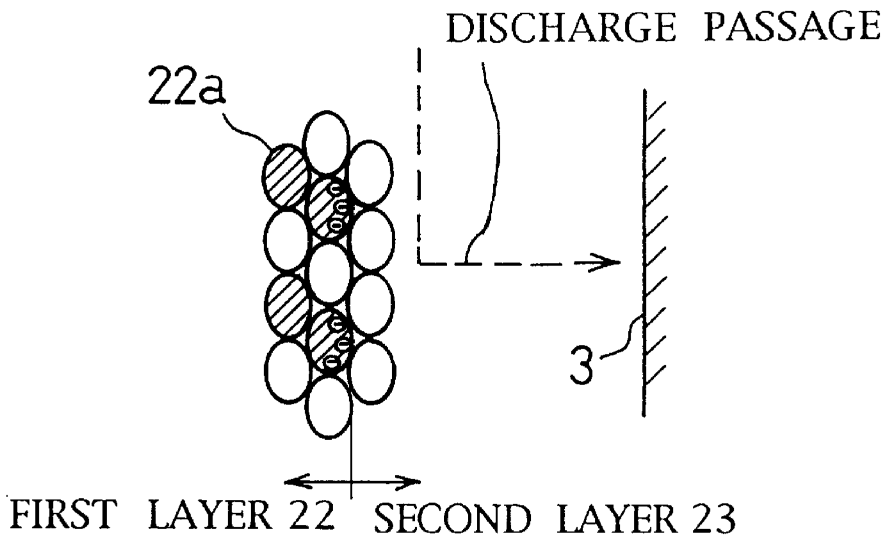
FIG. 43 is an enlarged cross-sectional view for typically showing discharge generation situation according to the Eighth Preferred Embodiment of the present invention.

In the above measurement, each electrode according to the Embodiments 37 and 38 show the excellent effect for preventing noise electric wave not only at the initial stage but also at 500 hours later. Concerning each electrode according to the Embodiments 37 and 38, the condition for generating discharge was enlarging photographed by high-speed video (0.001 sec/frame). The result is shown in FIG. 42. As shown in FIG. 42, discharge is generated from the boundary portion between the substrate 20 and the first layer 22. The discharge passage is extended toward the opposite electrode (cathode) 3 along the upper and lower surfaces and the tip surface of the electrode, and creeping discharge can be observed. Thus, when electron is moved on the creeping surface of the first layer 22 and the second layer 23 having high electric resistance, discharge energy is damped, thereby decreasing the generation of electric/magnetic field which causes noise. Furthermore, in each electrode according to the Embodiments 37 and 38, metal oxide in the first layer 22 exists as composite oxide such as $Al_2TiO_5$, and it contributes to the effect for preventing noise electric wave. Namely, when the component elements of $Al_2TiO_5$ such as Ti and O exist as $TiO_2$ having low electric resistance, the second layer 23 is broken, thereby generating discharge. At that time, the second layer 23 is fused and damaged. After that, discharge is generated from the tip surface of the second layer 23, and the effect for preventing noise electric wave is deteriorated. On the contrary, when metal oxide in the first layer 22 exists as composite oxide such as $Al_2TiO_5$, the above discharge passage and the effect for preventing noise electric wave can be obtained since $Al_2TiO_5$ shows higher electric resistance than that of $TiO_2$. Furthermore, in each electrode according to the Embodiments 37 and 38, the second layer 23 exists as an insulation layer. As a result, when electron of creeping discharge is moved toward the opposite electrode (cathode) 3, as shown in FIG. 43, the outflow of electron charged in oxide resistor 22 in the first layer 22 can be prevented by the second layer 23. Therefore, it is possible to prevent increasing in discharge current value due to outflow of electron, and to prevent increasing in noise electric wave.

A thermal sprayed layer is formed on the tip surface of the substrate 20 by plasma spraying method. The substrate 20 is made of brass, and the thermal sprayed layer is made of $Al_2TiO_5$ and has the thickness of 0.4 mm. Then, the direct current resistance value of $Al_2TiO_5$ was measured by an ammeter when the voltage of 100V was acted on a boundary portion between the upper surface of the substrate 20 and the tip surface of the thermal sprayed layer. As a result, the direct current resistance value was in the range of $1\times10^6$ to $1\times10^7$ ohm. Similarly, the direct current resistance value of $TiO_2$ was 10 ohm, and $Al_2O_3$ was $1\times10^{12}$ ohm.

(Relationship between the thickness of the second layer 23 and the effect for preventing noise electric wave)

Figure 44:
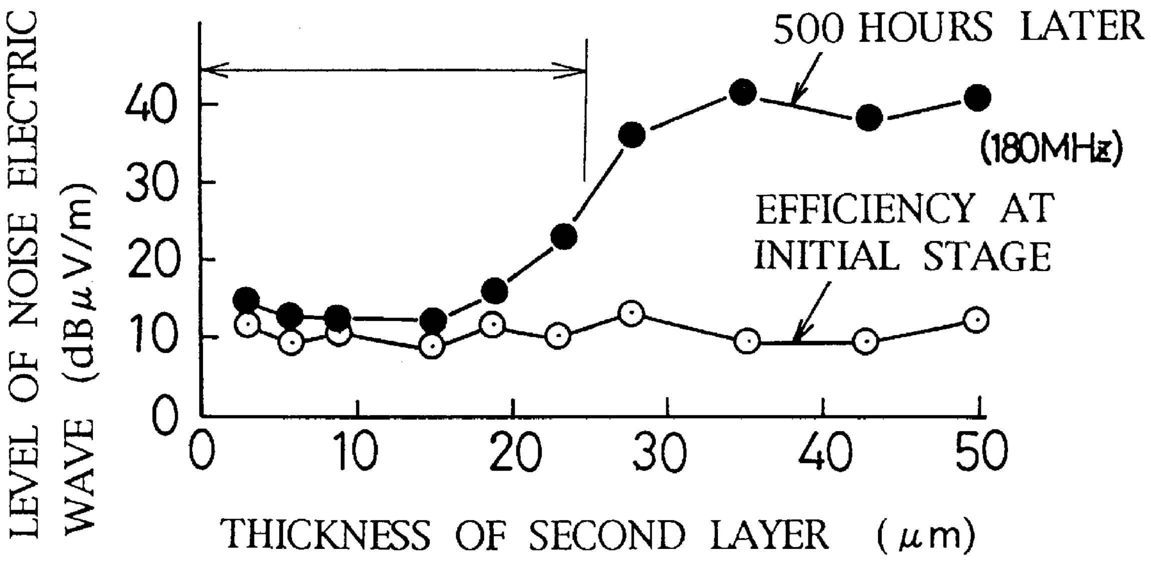
FIG. 44 is a graph for showing the relationship between the thickness of the second layer and the level of noise electric wave according to the Eighth Preferred Embodiment of the present invention.
Figure 45:
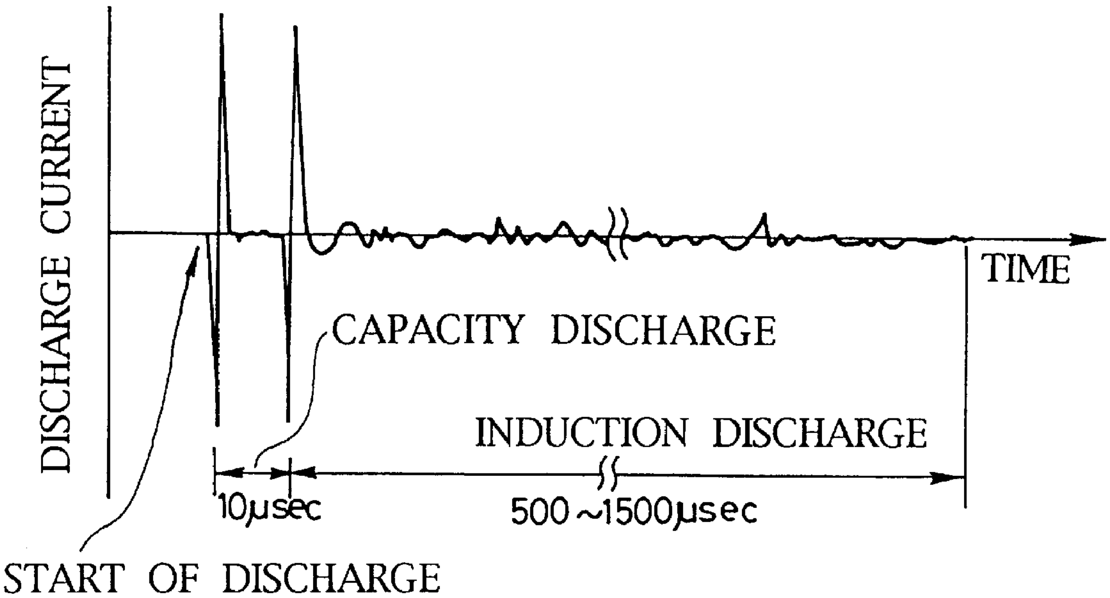
FIG. 45 is a graph for showing the result of examining the electric current profile model at the time of first discharge in the conventional electrode for preventing noise electric wave.
Figure 46:
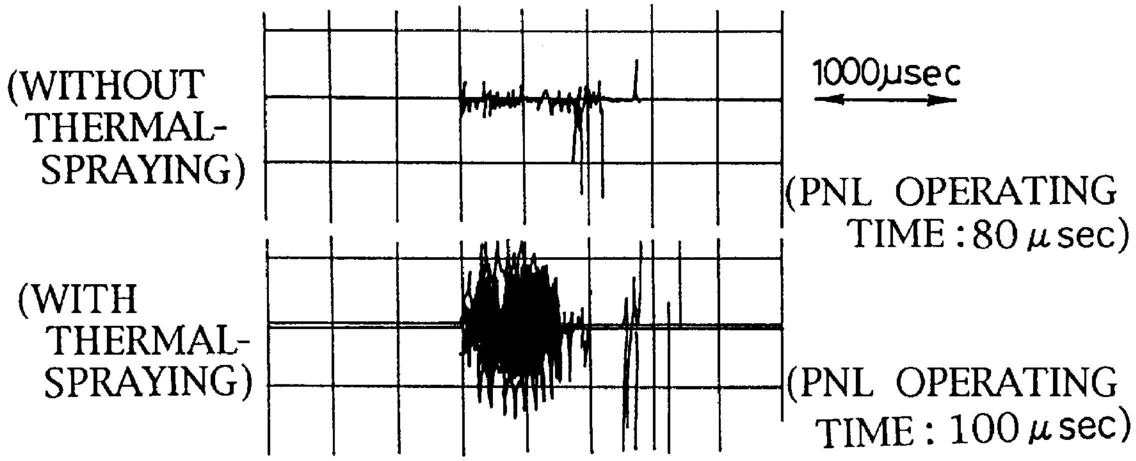
FIG. 46 is a graph for showing the result of comparison between the electric current profile model at the time of first discharge in the conventional electrode with the layer for preventing noise electric wave and the electric current profile model at the time of first discharge in the conventional electrode without the layer.

In the above Embodiment 38, while the total thickness of the first layer 22 and the second layer 23 is 0.4 mm, the thickness of the second layer 23 is variously changed. Then, the decreasing amount of the level of noise electric wave (decreasing amount of noise) having 180 MHz was measured at the initial stage and at 500 hours later. The result is shown in FIG. 44. This measurement was performed under the condition that the temperature was ordinary temperature, and that the engine speed was 1500 rpm.

In the above measurement, when the thickness of the second layer 23 is more than 25 microns, there is no problem on the initial noise characteristics. However, the level of noise is radically increased at 500 hours later. The reason of this is as follows. When the thickness of the second layer 23 is more than 25 microns, impedance of whole electrode becomes high. So, heating energy becomes high at the place for generating discharge, and the local place is fused and damaged. Therefore, it is preferable that the thickness of the second layer 23 is not more than 25 microns. Since the second layer 23 is used for preventing the outflow of electron from oxide resistor of the first layer 22, it is no problem that the second layer 23 is thin.

In each electrode for preventing noise electric wave according to claims 1 to 19, it is possible to prevent noise electric wave for a long time. As a result, other step for preventing noise electric wave such as a bonding wire is not required, so it is possible to decrease the cost and the manhour. Furthermore, since each electrode has the same noise level as that of a ceramic rotor electrode which is expensive, it is possible to use each electrode as a substitution for the ceramic rotor electrode. Therefore, it is possible to lower the cost remarkably.

The electrodes for preventing noise electric wave according to claims 1 to 4 comprises the first layer comprising oxide resistor and the second layer comprising oxide resistor, and the resistivity of the second layer located at outside is larger than that of the first layer. Therefore, it is possible to effectively prevent the generation of noise electric wave as compared with the conventional electrode which has a single layer comprising high electrical resistance substance.

The electrode for preventing noise electric wave according to claim 3 shows further effect for preventing noise electric wave due to the effect of creeping discharge and the effect for preventing outflow of electron caused by the second layer which is functioned as the insulating layer.

The electrode for preventing noise electric wave according to claim 4 has the same construction as that of the electrode according to claim 3 except that the second layer comprises both the oxide resistor and the oxide dielectric substance. As a result, the resistivity of the second layer is decreased, and the performance of the barrier at the time of discharge is decreased. Therefore, it is possible to prevent the generation of pin hole, and to improve the durability.

In each electrode for preventing noise electric wave according to claims 6 to 12, the generation of relatively large induction discharge current which is caused by the micro discharge at the porous portion of the thermal sprayed layer can be controlled. As a result, it is possible to prevent the radio noise which is caused by the induction discharge current.

In the first and seventh methods for producing the electrode according to claims 7 and 13, it is possible to firmly form the layer for preventing noise electric wave which comprises only a thermal sprayed layer having the porosity of not more than 20%.

In the second to fifth methods for producing the electrode according to claims 8 to 11, since thermal spraying is performed at each edge surface of a number of laminated electrode substrates, it is possible to prevent the formation of the porous thermal sprayed layer at least on the overlapping surface made by two neighboring electrode substrates. At the same time, it is possible to manufacture many electrodes productively, and to lower the cost.

In the third method for producing the electrode according to claim 9, each layer for preventing noise electric wave formed on each electrode substrate is previously separated by each spacer. Therefore, it is possible to control coming-off of the layer at the time of separating the layer for preventing noise electric wave, and to improve the quality.

In the fourth method for producing the electrode according claim 10, when the layer for preventing noise electric wave is separated along a dividing line of each electrode substrate, a breaking portion of a substrate thermal sprayed layer is used as a starting point. Therefore, it is possible to easily and firmly separate the layer for preventing noise electric wave, and to improve the quality.

In the fifth method for producing the electrode according to claim 11, since thermal spraying is performed, and at the same time, the electrode substrate is swung, the layer for preventing noise electric wave formed on each electrode substrate is not adhered to each other. As a result, it is possible to omit the process for separating the layer for preventing noise electric wave, and to prevent coming-off of the layer in the process for separating the layer. Furthermore, it is possible to improve the quality.

In the sixth method for producing the electrode according to claim 12, the layer for preventing noise electric wave is formed on one surface of long-shaped electrode substrate, and then the long-shaped electrode substrate is cut into many pieces. Therefore, it is possible to prevent the formation of the porous thermal sprayed layer at least on the cut surface of each electrode substrate, and to manufacture many electrodes productively, and to lower the cost. Furthermore, it is possible to prevent coming-off or slippage of the layer since the layer for preventing noise electric wave is separated by machining at the time of cutting.

In the electrode for preventing noise electric wave according to claim 14, since the high-fusing conductive material layer exists between the substrate and the resisting material layer, the portion for the discharge generation is moved from the substrate to the high-fusing conductive material layer. Therefore, it is possible to prevent the generation of fused loss which causes increase in noise electric wave.

In the electrode for preventing noise electric wave according to claim 15, the substrate comprises copper or copper alloy having high heat conductivity. As a result, it is possible to control fused loss at the high-fusing conductive material layer due to outgoing radiation from the substrate, and to improve the durability.

In the electrode for preventing noise electric wave according to claim 17, the substrate has the covering portion which is covered on the resisting material layer. Therefore, the damage of fused loss which causes the increase in noise electric wave is checked by the thickness of the covering portion, and it is possible to improve the durability.

In each electrode for preventing noise electric wave according to claims 18 and 19, since the above covering portion has a certain dimension, it is possible to further improve the durability.

Having now fully described the present invention, it will be apparent to one of ordinary skill in the art that many changes and modifications can be made thereto without departing from the spirit or scope of the present invention as set forth herein including the appended claims.

What is claimed is:

1. A low electric noise electrode system, comprising:

a first electrode and a metal second electrode separated from the first electrode by an air gap;

said first electrode comprising, a metal electrode substrate, a first layer comprising a material selected from the group consisting of a metal oxide, an oxide resistor, and a mixture of an oxide dielectric substance and an oxide resistor, said first layer formed on a surface of said substrate; and a second layer comprising a material of which said first layer is formed but having a larger resistivity than that of said first layer, said second layer being formed on the surface of said first layer covering said first layer and having an exposed surface placed opposite said second electrode with said air gap between the exposed surface of the second layer and the second electrode so as to conduct a discharge between said exposed surface and said second electrode upon application of a sufficiently high voltage across said exposed surface and said second electrode.

2. A low electric noise rotor electrode system for an automotive distributor rotor, comprising:

a first electrode and a metal second electrode separated from the first electrode by an air gap;

said first electrode comprising, a metal electrode substrate, a first layer comprising a material selected from the group consisting of a metal oxide, an oxide resistor, and a mixture of an oxide dielectric substance and an oxide resistor, said first layer formed on the surface of said substrate, and a second layer comprising a material of which said first layer is formed but having a larger resistivity than that of said first layer, said second layer being formed on the surface of said first layer covering said first layer and having an exposed surface placed opposite said second electrode with the air gap between the exposed surface of the second layer and the second electrode so as to conduct a discharge between said exposed surface and said second electrode upon application of a sufficiently high voltage across said exposed surface and said second electrode.

3. The low electric noise electrode system of claim 1, wherein the first layer has a surface facing said second electrode and the entire surface of said first layer facing said second electrode is covered by the second layer of the first electrode.

4. The low electric noise rotor electrode system of claim 2, wherein the first layer has a surface facing said second electrode and the entire surface of said first layer facing said second electrode is covered by the second layer of the first electrode.

5. An electrode for preventing noise electric wave according to the present invention comprising:

a substrate;

a first layer comprising oxide dielectric substance and oxide resistor, and being formed on the surface of said substrate faced to an opposite electrode; and a second layer comprising oxide dielectric substance, and being formed on the surface of said first layer faced to said opposite electrode, and having larger resistivity than that of said first layer.

6. An electrode for preventing noise electric wave according to the present invention comprising:

a substrate;

a high-fusing conductive material layer which is formed on the surface of said substrate faced to an opposite electrode, and which has the resistivity of not more than $10^4$ ohm centimeters, the fusing point of not less than 2000° C., and the thickness of not less than 30 microns; and not less than one resisting material layer which is coated on the surface of said high-fusing conductive material layer faced to said opposite layer.

7. An electrode for preventing noise electric wave according to claim 6, wherein said substrate comprises copper or copper alloy.

8. An electrode for preventing noise electric wave according to claim 6 or 7, wherein said high-fusing conductive material layer comprises not less than one kind of materials consisting of Mo, Ta, W, $Cr_2O_3$ and $CeO_2$.

9. An electrode for preventing noise electric wave according to the present invention comprising:

a substrate; and a resisting material layer which is coated on the surface of said substrate faced to an opposite electrode; wherein said substrate has a covering portion which is covered on the outer periphery of said resisting material layer, and which is located at the connecting portion between said substrate and said resisting material layer.

10. An electrode for preventing noise electric wave according to claim 9, wherein said coating portion of said substrate is not more than 0.34 mm.

11. An electrode for preventing noise electric wave according to claim 9 or 10, wherein the length of said coating portion of said substrate is not less than 0.1 mm.

12. An electrode for preventing noise electric wave according to the present invention comprising:

a substrate; and a layer for preventing noise electric wave comprising a thermal sprayed layer, and being coated on the surface of said substrate faced to an opposite electrode, and having the porosity of not more than 20%.

13. A method for producing an electrode for preventing noise electric wave according to the present invention comprising:

a process for forming a first layer which comprises metal oxide on the surface of a substrate faced to an opposite electrode; and a process for forming a second layer which comprises metal oxide and has larger resistivity than that of said first layer on the surface of said first layer faced to said opposite electrode by performing oxidation treatment on the surface of said first layer.

14. A method for producing an electrode for preventing noise electric wave according to the present invention comprising:

a process for forming a layer for preventing noise electric wave comprising a thermal sprayed layer which is formed on one surface of a substrate, and in which thermal spraying is performed in the direction approximately perpendicular to the surface, and which has the porosity of not more than 20%; and a process for removing said thermal sprayed layer in which thermal spraying is performed on the other surface of said substrate, and which has the porosity of more than 20%.

15. A method for producing an electrode for preventing noise electric wave according to the present invention comprising:

a process for laminating a number of substrates;

a process for forming a layer for preventing noise electric wave comprising a thermal sprayed layer which is formed on each edge surface of each substrate, and in which thermal spraying is performed in the direction approximately perpendicular to each edge surface, and which has the porosity of not more than 20%; and a process for separating said layer for preventing noise electric wave along a dividing line of each electrode substrate.

16. A method for producing an electrode for preventing noise electric wave according to the present invention comprising:

a process for laminating a number of substrates having a spacer therebetween in which edge portion of each spacer is projected from the edge surface of each substrate by the predetermined length;

a process for forming a layer for preventing noise electric wave comprising a thermal sprayed layer which is formed on each edge surface of each substrate, and in which thermal spraying is performed in the direction approximately perpendicular to each edge surface in such a manner that the thickness of said thermal sprayed layer is thinner than said predetermined length, and which has the porosity of not more than 20%; and a process for tearing said layer for preventing noise electric wave off from each spacer.

17. A method for producing an electrode for preventing noise electric wave according to the present invention comprising:

a process for laminating a number of substrates;

a process for forming a substrate thermal sprayed layer which is formed on each edge surface of each substrate, and in which thermal spraying is performed in the direction approximately perpendicular to each edge surface;

a process for separating said substrate thermal sprayed layer along a dividing line of each substrate;

a process for re-laminating each substrate coated with said substrate thermal sprayed layer;

a process for forming a layer for preventing noise electric wave comprising a thermal sprayed layer which is coated on said substrate thermal sprayed layer formed on each edge surface of each substrate, and in which thermal spraying is performed in the direction approximately perpendicular to each edge surface of re-laminating substrate, and which has the porosity of not more than 20%; and a process for separating said layer for preventing noise electric wave along a dividing line of each substrate.

18. A method for producing an electrode for preventing noise electric wave according to the present invention comprising:

a process for laminating a number of substrates; and a process for forming a layer for preventing noise electric wave comprising a thermal sprayed layer which is formed on each edge surface of each substrate; and in which thermal spraying is performed in the direction approximately perpendicular to each edge surface, and at the same time, said substrate is swung in order to repeat relative displacement between two edge surfaces of two neighboring substrates; and which has the porosity of not more than 20%.

19. A method for producing an electrode for preventing noise electric wave according to the present invention comprising:

a process for forming a layer for preventing noise electric wave comprising a thermal sprayed layer which is formed on one surface of long-shaped substrate, and in which thermal spraying is performed in the direction approximately perpendicular to said surface, and which has the porosity of not more than 20%; and a process for cutting said long-shaped substrate into many pieces in the direction perpendicular to said surface.

20. A method for producing an electrode for preventing noise electric wave according to the present invention comprising:

a process for forming a layer for preventing noise electric wave comprising a thermal sprayed layer which is formed on one surface of said substrate, and in which thermal spraying is performed in the direction approximately perpendicular to said surface, and which has the porosity of not more than 20%; and a process for fusing said thermal sprayed layer in which thermal spraying is performed on the other surface of said substrate, and which has the porosity of more than 20% by means of high density energy to be densified.

* * * * *